(12) United States Patent
Chu et al.

(10) Patent No.: US 12,366,444 B2
(45) Date of Patent: Jul. 22, 2025

(54) OPTICAL ASSEMBLY FOR PARALLELISM MEASUREMENT, OPTICAL APPARATUS INCLUDING THE SAME, DIE BONDING SYSTEM AND DIE BONDING METHOD USING THE SAME

(71) Applicant: SAMSUNG ELECTRONICS CO., LTD., Suwon-si (KR)

(72) Inventors: Jiyoung Chu, Suwon-si (KR); Hyungjin Kim, Suwon-si (KR); Minhwan Seo, Suwon-si (KR); Wondon Joo, Suwon-si (KR); Dongyoon Koo, Suwon-si (KR); Sangwoo Bae, Suwon-si (KR); Sungmin Ahn, Suwon-si (KR); Jungyu Lee, Suwon-si (KR); Yunpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 18/123,788

(22) Filed: Mar. 20, 2023

(65) Prior Publication Data
US 2023/0392925 A1    Dec. 7, 2023

(30) Foreign Application Priority Data
Jun. 3, 2022    (KR) .................. 10-2022-0068356

(51) Int. Cl.
*G01B 11/27*    (2006.01)
*G02B 5/08*     (2006.01)
*G02B 27/28*    (2006.01)

(52) U.S. Cl.
CPC .......... *G01B 11/272* (2013.01); *G02B 5/0808* (2013.01); *G02B 27/283* (2013.01); *G02B 27/286* (2013.01)

(58) Field of Classification Search
CPC .... G01B 11/272; G01B 11/26; G02B 5/0808; G02B 27/283; G02B 27/286; H01L 21/67144; H01L 21/681
See application file for complete search history.

(56) References Cited

U.S. PATENT DOCUMENTS 5,461,472 A     10/1995    Harvey et al.
7,394,073 B2 *   7/2008    Cummings ........... H01J 37/244
                                              250/397

(Continued)

FOREIGN PATENT DOCUMENTS

JP    2004-207569 A    7/2004
JP       3795024 B2    7/2006

(Continued)

OTHER PUBLICATIONS

Manuel Fendler et al. "Technological and Electrical Performances of Ultrafine-Pitch Flip-Chip Assembly Based on Room-Temperature Vertical Interconnection" IEEE Transactions on Components, Packaging and Manufacturing Technology, Mar. 2011, vol. 1-Issue No. 3, p. 291-298.

(Continued)

*Primary Examiner* — Hung V Nguyen
(74) *Attorney, Agent, or Firm* — Sughrue Mion, PLLC

(57) ABSTRACT

A method of bonding a die to a wafer using a die bonding system measures, using an obtained image showing interference fringes, a parallelism between the die and the wafer. In some embodiments, parallelism and die deformation are detected using interference fringes produced by an optical apparatus of the die bonding system. A parallelism measurement optical apparatus includes a light source, an optical assembly configured to control polarization of a reference light and a measurement light. In some embodiments, the measurement light is sequentially incident on and reflected from a first measurement surface and a second measurement (Continued)

surface that are spaced apart along a vertical direction to face each other, and is emitted to have information on parallelism between the first and second measurement surfaces. In some embodiments, a first polarizer is configured to interfere the reference light and the measurement light emitted from the optical assembly with each other. A light detector is configured to detect an interference signal of lights including the interference fringes.

20 Claims, 24 Drawing Sheets

(56) References Cited

U.S. PATENT DOCUMENTS

| | | |
|---|---|---|
| 8,875,979 B2 | 11/2014 | Yung et al. |
| 9,425,163 B2 | 8/2016 | Schmidt-Lange et al. |
| 11,002,783 B2 * | 5/2021 | Lin .................. G01R 29/14 |
| 11,255,663 B2 * | 2/2022 | Binder ................ G01S 15/08 |
| 11,466,978 B2 * | 10/2022 | Ghim ............... G01B 9/02084 |

FOREIGN PATENT DOCUMENTS

| | | |
|---|---|---|
| JP | 2011-75316 A | 4/2011 |
| JP | 5181662 B2 | 4/2013 |
| JP | 5589397 B2 | 9/2014 |
| JP | 6089548 B2 | 3/2017 |
| KR | 10-2019-0116981 A | 10/2019 |

OTHER PUBLICATIONS

Amram Eitan et al. "Thermo-compression Bonding for Fine-pitch Copper-pillar Flip-chip Interconnect—Tool Features as Enablers of Unique Technology" IEEE Electronic Components & Technology Conference, May 2015, p. 460-464, Electronic ISBN:978-1-4799-8609-5.

* cited by examiner

INTERFERENCE REGION BETWEEN MEASURENT LIGHT AND REFERENCE LIGHT

REFERENCE LIGHT

INTERFERENCE REGION BETWEEN MEASURENT LIGHT AND REFERENCE LIGHT

REFERENCE LIGHT

INTERFERENCE REGION BETWEEN MEASURENT LIGHT AND REFERENCE LIGHT

REFERENCE LIGHT

INTERFERENCE REGION BETWEEN MEASURENT LIGHT AND REFERENCE LIGHT

REFERENCE LIGHT

OPTICAL ASSEMBLY FOR PARALLELISM MEASUREMENT, OPTICAL APPARATUS INCLUDING THE SAME, DIE BONDING SYSTEM AND DIE BONDING METHOD USING THE SAME

PRIORITY STATEMENT

This application claims priority under 35 U.S.C. § 119 to Korean Patent Application No. 10-2022-0068356, filed on Jun. 3, 2022 in the Korean Intellectual Property Office (KIPO), the contents of which are herein incorporated by reference in their entirety.

BACKGROUND

1. Field

Example embodiments relate to an optical assembly for measuring parallelism, an optical apparatus including the same, a die bonding system and a die bonding method using the same. More particularly, example embodiments relate to an optical assembly for an alignment inspection between a die and a wafer, an optical apparatus including the same, a die bonding system and a method of bonding a die on a wafer using the same.

2. Description of the Related Art

In die-to-wafer bonding for manufacturing electronic products, e.g., DDR (Double Data Rate) memory, HBM (High Bandwidth Memory), CIS (CMOS image sensor), etc., it may be important to ensure bonding accuracy between a die and a wafer. To this end, there is a need for a measurement apparatus capable of measuring a shape to maintain parallelism between the die and the wafer and to control deformation of the die. According to a related measurement apparatus, there is a problem that an error may occur in the parallelism measurement value between the die and the wafer due to the tilt of the measurement apparatus itself. In addition, a measurement apparatus capable of measuring die deformation together with the parallelism balance may be required.

SUMMARY

Example embodiments provide an optical assembly for measuring parallelism between a wafer and a die in order to improve bonding accuracy in die-to-wafer bonding.

Example embodiments provide an optical apparatus including the optical assembly.

Example embodiments provide a die bonding system including the optical apparatus.

Example embodiments provide a method of bonding a die on a wafer using the die bonding system.

According to example embodiments, an optical apparatus includes a first polarizing beam splitter configured to divide an incident light into a reference light and a measurement light, a reference mirror disposed on a side of a first surface of the first polarizing beam splitter and configured to reflect the reference light reflected from the first polarizing beam splitter again to the first polarizing beam splitter, a first quarter wave plate disposed between the first polarizing beam splitter and the reference mirror and configured to change a polarization state of the reference light, a second polarizing beam splitter disposed on a side of a second surface adjacent to the first surface of the first polarizing beam splitter and configured to reflect the measurement light passing through the first polarizing beam splitter, a second quarter wave plate disposed on a side of a first surface of the second polarizing beam splitter and configured to change a polarization state of the measurement light reflected from the second polarizing beam splitter, a third quarter wave plate disposed on a side of a third surface opposite to the first surface of the second polarizing beam splitter and configured to change the polarization state of the measurement light passing through the second polarizing beam splitter, a reflection mirror disposed on a side of a second surface adjacent to the first surface of the second polarizing beam splitter and configured reflect the measurement light reflected from the second polarizing beam splitter again to the second polarizing beam splitter, and a fourth quarter wave plate disposed between the second polarizing beam splitter and the reflection mirror and configured to change the polarization state of the measurement light reflected from the second polarizing beam splitter.

According to example embodiments, a parallelism measurement optical apparatus includes a first illuminator configured to irradiate a linearly polarized first light, an optical assembly configured to polarization modulate the first light to divide into a reference light having a first polarization component and a measurement light having a second polarization component, wherein the measurement light is sequentially incident on and reflected from a first measurement surface and a second measurement surface that are spaced apart along a vertical direction to face each other, and is emitted to have information on parallelism between the first and second measurement surfaces, a first polarizer configured to interfere the reference light and the measurement light emitted from the optical assembly with each other, and a first light detector configured to detect an interference signal of lights emitted from the first polarizer.

According to example embodiments, a die bonding system includes a first stage having a first surface, the first stage being configured to hold a wafer on the first surface, a second stage having a second surface, the second stage being configured to hold a die on the second surface, the first surface and the second surface being spaced apart along a vertical direction to face each other, a first driver configured to move at least one of the first stage and the second stage relative to each other, and an optical apparatus configured to measure parallelism between a wafer surface and a die surface. The optical apparatus includes an optical assembly installed so as to be movable in a horizontal direction perpendicular to the vertical direction between the first and second stages, the optical assembly configured to divide an incident first light into a reference light having a first polarization component and a measurement light having a second polarization component, wherein the measurement light is sequentially incident on and reflected from the wafer surface and the die surface and then is emitted, a first polarizer configured to interfere the reference light and the measurement light emitted from the optical assembly with each other, and a first light detector configured to detect an interference signal of lights emitted from the first polarizer.

According to example embodiments, an optical assembly of a parallelism measurement optical apparatus may include first and second polarizing beam splitters, four quarter wave plates and two mirrors. A first light incident on the optical assembly may be divided into a first measurement light and a first reference light, and the first measurement light may be sequentially reflected on a wafer surface and a die surface and then may be emitted from the optical assembly.

Accordingly, the first measurement light emitted from the optical assembly may have information on an inclination of the die surface with respect to the wafer surface, and an interference fringe between the first reference light and the first measurement light may be analyzed to determine the inclination of the die surface with respect to the wafer surface. Further, when the wafer surface is flat, the parallelism measurement optical apparatus may measure the deformation of the die surface through the interference fringe.

The parallelism measurement optical apparatus may measure the parallelism between the die and the wafer without being affected by the tilt of the optical assembly, and may direct a collimated light having an area to be incident onto the wafer surface and the die surface and light reflected therefrom may be detected, to measure the degree of deformation of the die.

Further, a second light incident on the optical assembly may be divided into a second measurement light and a second reference light, and the second measurement light may be emitted after being reflected from the wafer surface. Accordingly, the second measurement light emitted from the optical assembly may have information on the wafer surface, and an interference fringe between the second reference light and the second measurement light may be analyzed to determine the degree of tilt of the optical assembly with respect to the wafer surface.

Accordingly, the second light may be changed to have a wavelength different from that of the first light to measure the tilt of the optical assembly with respect to the wafer surface. Further, an interferometric optical system including the optical assembly may be attached to an optical microscope for measuring alignment marks and used to correct tilt of the optical microscope.

Also provided herein is a method of bonding a die to a wafer using a die bonding system, the method including simultaneously measuring, using an optical apparatus of the die bonding system, a parallelism between the die and the wafer and a deformation of the die, wherein the die is held by an upper support structure of the die bonding system and the wafer is held by a lower support structure of the die bonding system, and wherein the parallelism and deformation are detected using interference fringes produced by the optical apparatus, correcting a tilt of the die with respect to the wafer, and making the die, based on the measured deformation, an improved shape; and bonding the die to the wafer.

BRIEF DESCRIPTION OF THE DRAWINGS

Example embodiments will be more clearly understood from the following detailed description taken in conjunction with the accompanying drawings. FIGS. 1 to 13 represent non-limiting, example embodiments as described herein.

FIG. 1 is a cross-sectional view illustrating a die bonding system in accordance with example embodiments.

FIG. 2 is a view illustrating an optical apparatus for measuring parallelism between a wafer and a die in accordance with example embodiments.

FIG. 3 is a plan view illustrating an optical path of a reference light separated from an incident light by an optical assembly of the optical apparatus for measuring parallelism in FIG. 2.

FIG. 4 is a front view illustrating an optical path of a measurement light separated from the incident light by the optical assembly of the optical apparatus for measuring parallelism in FIG. 2.

FIG. 5 is a plan view of FIG. 4.

FIG. 6 is a cross-sectional view illustrating a state in which an optical assembly is tilted when parallelism between a wafer and a die is measured using the optical apparatus of FIG. 1.

FIG. 9 is a view illustrating a parallelism measurement optical apparatus in accordance with example embodiments.

FIG. 10 is a plan view illustrating an optical path of a second reference light separated from a second incident light by an optical assembly of the parallelism measurement optical apparatus in FIG. 9.

FIG. 11 is a front view illustrating an optical path of a second measurement light separated from the second incident light by the optical assembly of the parallelism measurement optical device in FIG. 9.

FIG. 12 is a plan view of FIG. 11.

FIG. 13 is a cross-sectional view illustrating a state in which a degree of tilt of the parallelism measurement optical apparatus including the optical assembly is measured using the parallelism measurement optical apparatus in FIG. 9.

DETAILED DESCRIPTION OF EXAMPLE EMBODIMENTS

Hereinafter, example embodiments will be explained in detail with reference to the accompanying drawings.

Figure 1:
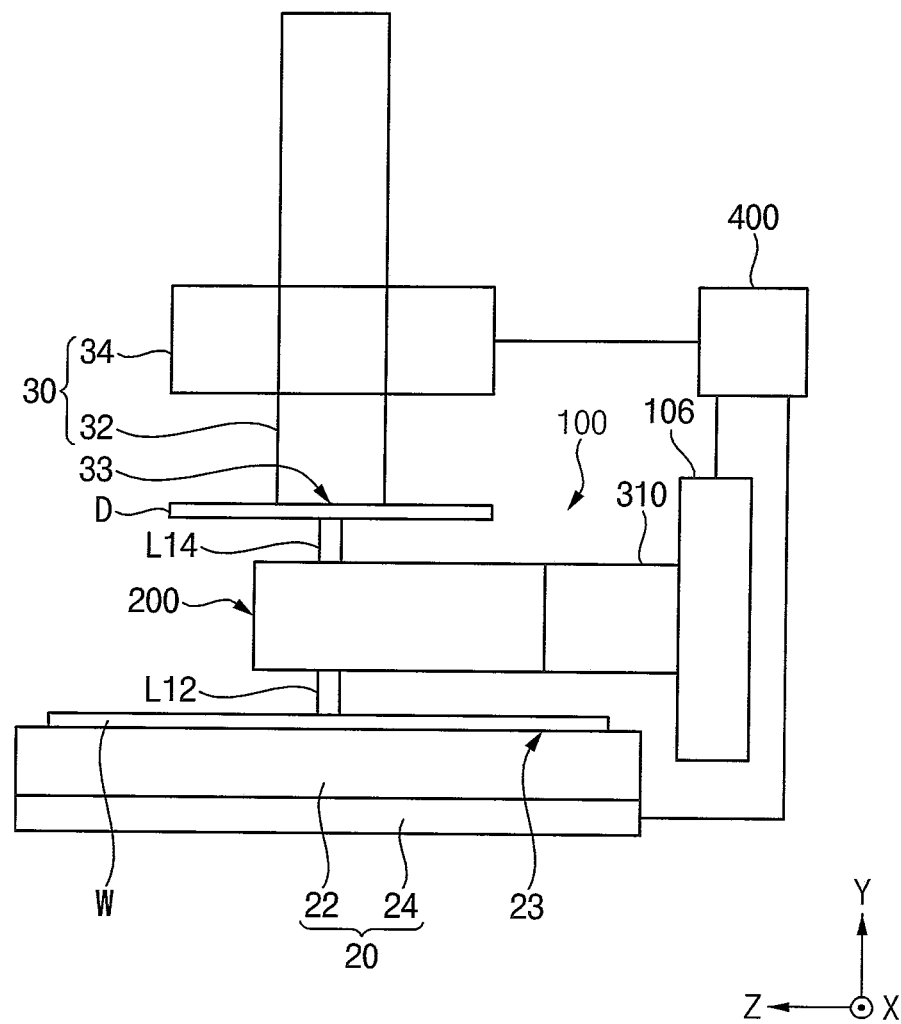

FIG. 1 is a cross-sectional view illustrating a die bonding system in accordance with example embodiments.

Referring to FIG. 1, a die bonding system 10 may include a lower support structure 20, an upper support structure 30 and an optical apparatus 100 for measuring parallelism measurement. Additionally, the die bonding system 10 may further include an optical apparatus for alignment inspection, a plurality of drivers and a controller 400 configured to control operations of the drivers.

In example embodiments, the die bonding system 10 may be used to pick up a die D (or stacked dies) individualized through a sawing process and bond the die D onto a substrate, e.g., a wafer W, a printed circuit board, etc. A bonding head driver 34 of the drivers may adsorb the die D using the upper support structure 30 as a bonding head and move the bonding head so as to bond the adsorbed die D onto the wafer W. For example, the bonding head driver 34 may move the bonding head in the X direction, the Y direction, and the Z direction. In another example, the bonding head driver 34 may move the bonding head in the Z direction, and a first stage driver 24 of the drivers may move the wafer W in the X direction and the Y direction, and may rotate the wafer W about the center of the wafer W. Additionally, the die bonding system 10 may be used to bond the individualized die D onto another die or to bond a wafer onto another wafer.

In particular, the lower support structure 20 may include a first stage 22 that holds the wafer W. The first stage 22 may have a first suction surface 23 on which the wafer W is disposed. First suction holes may be provided in the first suction surface 23 of the first stage 22. The wafer W may be held via vacuum suction by the first suction holes of the first stage 22.

The upper support structure 30 may include a second stage 32 that holds the die D. The second stage 32 may be arranged to face the first stage 22. The first and second stages 22 and 32 may be arranged, e.g., spaced apart from each other, in the vertical direction (Z direction) to be parallel with each other. The second stage 32 may have a second suction surface 33 on which the die D is disposed. An adsorption structure such as a collet may be provided in the second suction surface 33 of the second stage 32. The die D may be vacuum suctioned by the adsorption structure provided in the second stage 32.

Holding of the wafer W and the die D may be performed in various ways. For example, the wafer W and the die D may be held via vacuum suction by the suction holes and the adsorption structure. In another example, the wafer W and the die D may be held using an electrostatic force, e.g., as an electrostatic chuck, or may be fixedly supported using a fixing mechanism. e.g., a clamper.

In example embodiments, the die bonding system 10 may further include the bonding head driver 34 and/or the first stage driver 24 as the drivers configured to move the first stage 22 and the second stage 32 relative to each other.

For example, the upper support structure 30 may include the bonding head driver 34 which moves the second stage 32. The bonding head driver 34 may include a horizontal driver to move translationally the second stage 32 in the X, Y, Z directions and a rotational driver to rotate the second stage 32 about the Z axis.

The second stage 32 may be installed to be movable translationally and rotationally by the bonding head driver 34 such that a relative position between the second stage 32 and the first stage 22 is adjusted.

The lower support structure 20 may include the first stage driver 24 which moves the first stage 22. The first stage driver 24 may perform similar functions as the bonding head driver 34.

A spacing distance between the first and second stages 22 and 32 may be adjusted by the bonding head driver 34 and/or the first stage driver 24.

In example embodiments, the optical apparatus 100 for measuring parallelism may measure the parallelism between the wafer W and the die D to adjust the parallelism and measure the deformation of the die D to provide an optimized state for bonding, before bonding the die D on the wafer W.

For example, the optical apparatus 100 for measuring parallelism may include a polarization interference optical system that divides synthetic light incident from a light source into a measurement light and a reference light and interfere the reference light and the measurement light that is sequentially incident on and reflected from a wafer surface and a die surface to analyze an inference fringe using first and second polarizing beam splitters, quarter wave plates, and mirrors to thereby measure the parallelism between the wafer surface and the die surface. The polarizing beam splitters, the quarter wave plates and the mirrors serve as optical switches, so that the measurement light is sequentially incident on and reflected from the wafer surface and the die surface to have information on the inclination between the wafer surface and the die surface, and then the measurement light is arranged to interfere with the reference light and provide information on the relative inclination between the wafer surface and the die surface.

The optical apparatus 100 for measuring parallelism may irradiate the light having a diameter of, for example, several millimeters to several tens of millimeters (mm) on the wafer surface and/or the die surface and analyze the interference fringes of the reflected lights, to measure the inclination of the die surface with respect to the wafer surface and/or the deformation in the die surface.

The optical apparatus 100 for measuring parallelism may further include an optical assembly driver 106 that moves the optical assembly 200 to a measuring position between the first and second stages 22 and 32 or to a standby position outside the measuring position. The optical assembly driver 106 may move the optical assembly 200 to the measurement position in order to measure the parallelism between the wafer surface and the die surface. Additionally, the optical assembly driver 106 may move the optical assembly 200 to the standby position in order to bond the die D to the wafer W after detecting the interference fringe between the wafer surface and the die surface. As will be described later, the optical apparatus 100 for measuring parallelism may include an illuminator and a light detector that are integrally formed with the optical assembly 200 to constitute a single body, and the optical assembly 200, the illuminator and the light detector of the single body may be integrally moved by the optical assembly driver 106.

In example embodiments, the optical apparatus for alignment inspection may simultaneously image a first alignment mark M1 formed on the wafer W and a second alignment mark M2 formed on the die D after adjusting the parallelism between the wafer W and the die, and may provide information about a relative position between the first and second alignment marks M1 and M2.

For example, the optical apparatus for alignment inspection may include an optical microscope that includes a focusing optical system for irradiating illumination lights on the first and second alignment marks having a size of several hundred micrometers (μm) and transmitting reflected lights reflected from the first and second alignment marks and a light receiving optical system for detecting the reflected lights emitted from the focusing optical system.

In example embodiments, a controller 400 may calculate parallelism between the die D and the wafer W based on the interference fringe obtained from the parallelism measurement optical apparatus 100 and may control operations of the drivers, e.g., operations of the bonding head driver 34 and/or the first stage driver 24 in order to adjust the parallelism.

Additionally, the controller 400 may calculate an alignment error between the die D and the wafer W based on the relative position between the first and second alignment marks obtained from the alignment inspection optical apparatus and may control operations of the drivers, e.g., operations of the bonding head driver 34 and/or the first stage driver 24, in order to remove the alignment error.

Hereinafter, the optical apparatus for parallelism measurement will be explained.

Figure 2:
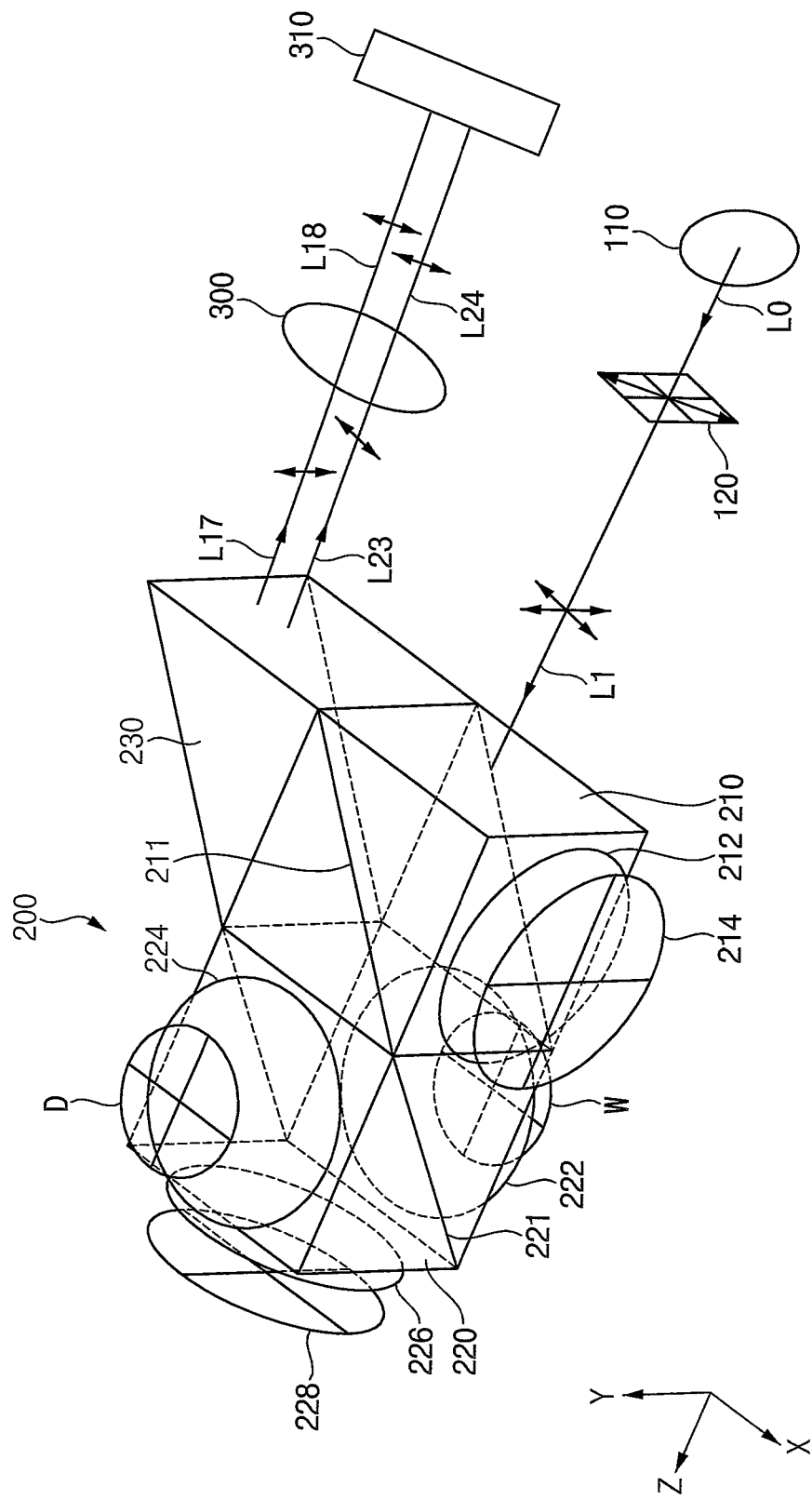
Figure 3:
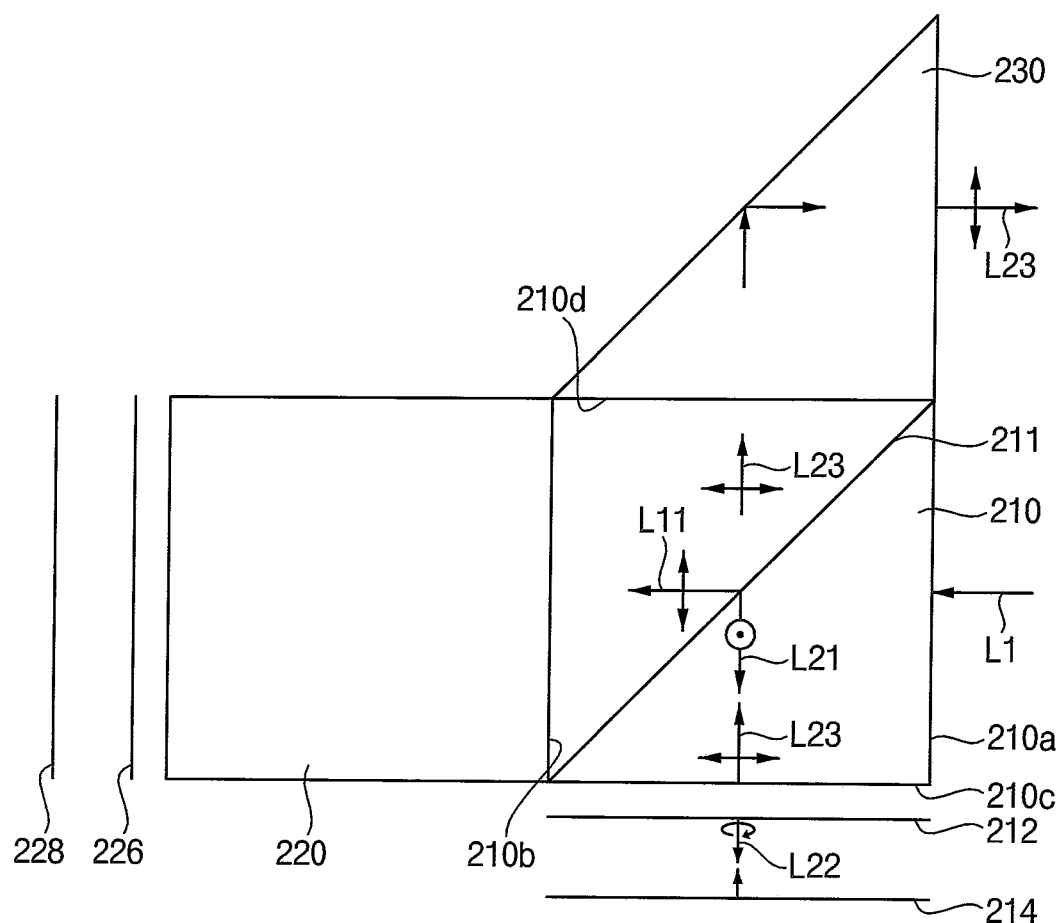
Figure 4:
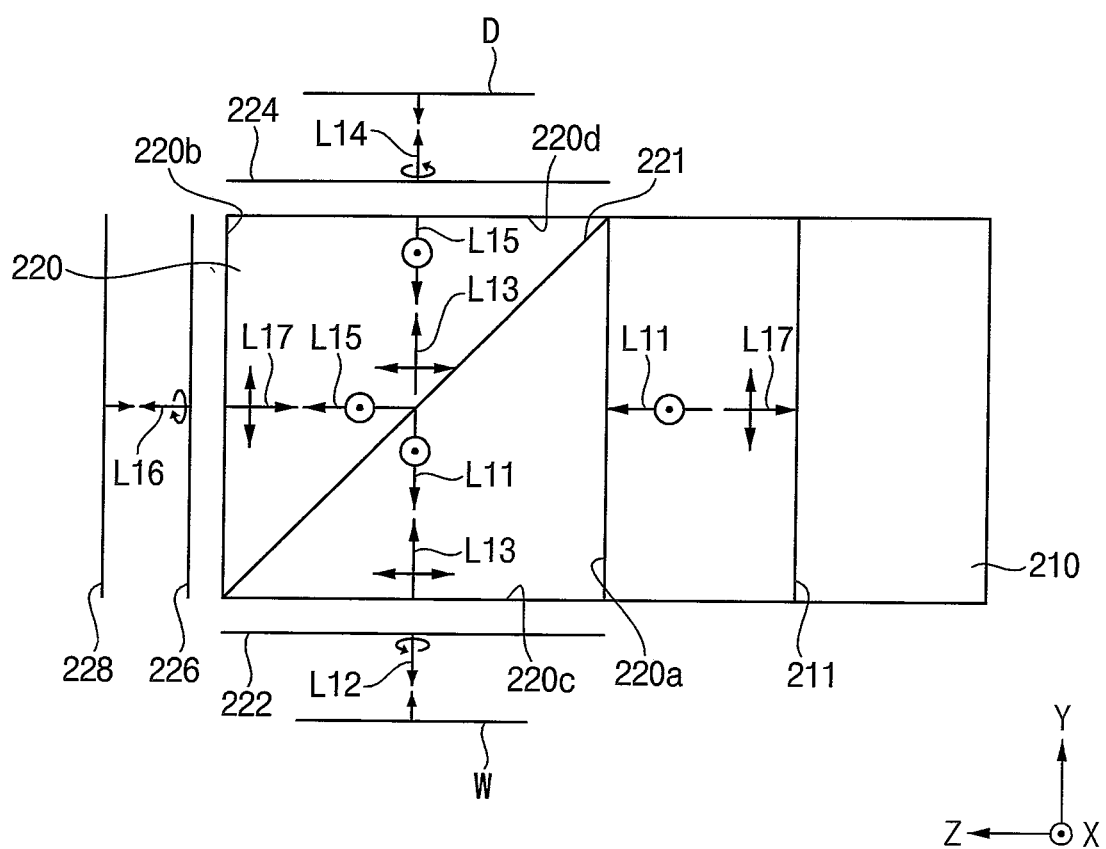
Figure 5:
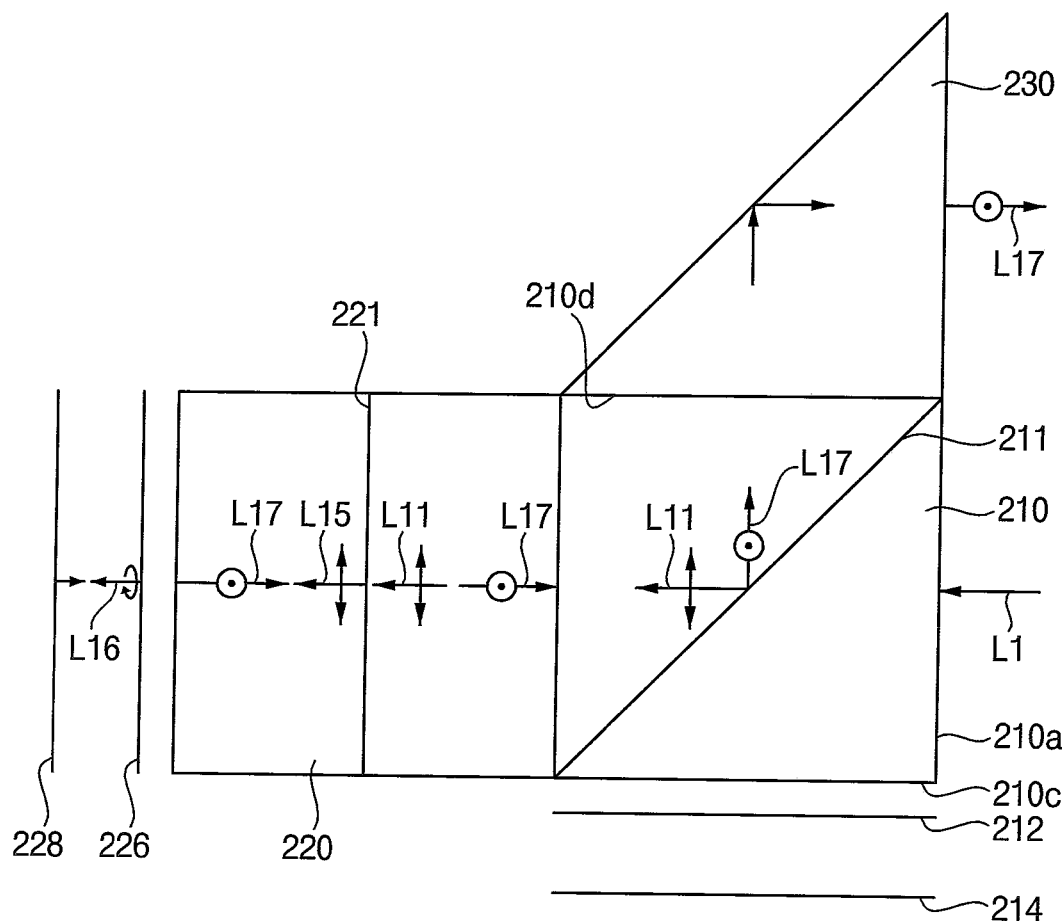

FIG. 2 is a view illustrating an optical apparatus for measuring parallelism between a wafer and a die in accordance with example embodiments. FIG. 3 is a plan view illustrating an optical path of a reference light separated from an incident light by an optical assembly of the optical apparatus for measuring parallelism in FIG. 2. FIG. 4 is a front view illustrating an optical path of a measurement light separated from the incident light by the optical assembly of the optical apparatus for measuring parallelism in FIG. 2. FIG. 5 is a plan view of FIG. 4.

Referring to FIGS. 2 to 5, a parallelism measurement optical apparatus 100 may include a first illuminator, an optical assembly 200 and a first light detector. The components of the first illuminator, the optical assembly 200 and the first light detector may be integrally formed to have a rigid body.

In example embodiments, the first illuminator may include a first light source 110 and a linear polarizer 120. The first light source 110 may generate a first light L0 having a first wavelength 1. For example, the first light source 110 may generate a coherent light. The first light L0 irradiated from the first light source 110 may be converted into parallel light through a collimating lens. An area of the parallel light may have a diameter of several millimeters to several tens of millimeters (mm).

The first light L0 irradiated from the first light source 110 may be linearly polarized in a 45° direction by the linear polarizer 120. The first light L1 passing through the linear polarizer 120 may be incident on the optical assembly 200 in a first direction (Z direction). The first light L1 passing through the linear polarizer 120 may be a synthetic light including a vertical polarization component (Y direction component) and a horizontal polarization component (X direction component).

In example embodiments, the optical assembly 200 may divide the incident first light L1 into a reference light having a first polarization component and a measurement light having a second polarization component, and may direct the measurement light to be sequentially incident on a first measurement surface (eg, a wafer surface) and a second measurement surface (eg, a die surface) and emit lights that are reflected from the first and second measurement surfaces and re-incident on the optical assembly 200. The optical assembly 200 may be installed to be movable in a horizontal direction (XZ plane direction) between the first stage 22 (see FIG. 1) and the second stage 32 (see FIG. 1).

In particular, the optical assembly 200 may include a first polarizing beam splitter 210, a first quarter-wave plate 212, a reference mirror 214 and an optical switch. The optical switch may include a second polarizing beam splitter 220, a second quarter wave plate 222, a third quarter wave plate 224, a fourth quarter wave plate 226 and a reflection mirror 228. Additionally, the optical assembly 200 may further include a right-angle prism 230.

The first polarizing beam splitter 210 may split the incident first light L1 into the measurement light L11 and the reference light L21.

The reference mirror 214 may be disposed on a side of a first surface 210c of the first polarizing beam splitter 210, and may reflect the reference light L21 reflected from the first polarizing beam splitter 210 again to the first polarizing beam splitter 210.

The first quarter wave plate 212 may be disposed between the first polarizing beam splitter 210 and the reference mirror 214, and may change a polarization state of the reference light.

The second polarizing beam splitter 220 may be disposed on a side of a second surface 210b adjacent to the first surface 210c of the first polarizing beam splitter 210, and may split the measurement light L11 passing through the first polarizing beam splitter 210 based on the polarization state.

The second quarter wave plate 222 may be disposed on a side of a first surface 220c of the second polarizing beam splitter 220, and change the polarization state of the measurement light L11 reflected from the second polarizing beam splitter 220.

The third quarter wave plate 224 may be disposed on a side of a third surface 220d opposite to the first surface 220c of the second polarizing beam splitter 220, and change the polarization state of the measurement light L13 passing through the second polarizing beam splitter 220.

The reflection mirror 228 may be disposed on a side of a second surface 220b adjacent to the first surface 220c of the second polarizing beam splitter 220, and may reflect the measurement light L15 reflected from the second polarizing beam splitter 220 again to the second polarizing beam splitter 220.

The fourth quarter wave plate 226 may be disposed between the second polarizing beam splitter 220 and the reflection mirror 228, and change the polarization state of the measurement light L15 reflected from the second polarizing beam splitter 220.

As illustrated in FIG. 3, the first polarizing beam splitter 210 may divide the incident first light L1 into the measurement light L11 and the reference light L21. The first polarizing beam splitter 210 may transmit the X direction (second direction) component and reflect the Y direction (third direction) component. The measurement light L11 may include P-polarized light of the first light L1 that has passed through an inclined surface 211 as the first polarization splitting surface of the first polarizing beam splitter 210, and the reference light L21 may include S-polarized light of the first light L1 reflected from the inclined surface 211 of the first polarizing beam splitter 210.

The measurement light L11 passing through the first polarizing beam splitter 210 may be incident on the second polarizing beam splitter 220. The reference light L21 reflected by the first polarizing beam splitter 210 may be emitted through the first surface 210c of the first polarizing beam splitter 210 and may be incident on the reference mirror 214 past the first quarter wave plate 212. The reference light L22 reflected by the reference mirror 214 may pass through the first quarter wave plate 212 and may be re-incident on the first surface 210c of the first polarizing beam splitter 210.

The first quarter wave plate 212 may change the polarization state of the light passing therethrough. The first quarter wave plate 212 may delay the phase of the light passing therethrough. The first quarter wave plate 212 may be selected such that a phase delay difference of $(n+\frac{1}{2})\pi$ occurs at the first wavelength (where n is an integer). The axis of the first quarter wave plate 212 may be installed to rotate by 45° (−45°). The first wavelength $\lambda 1$ of the first light may be selected in consideration of the wavelength delay characteristic of the first quarter wave plate.

The first quarter wave plate 212 may delay the phase of the passing light by 90°. The reference light L22 passing through the first quarter wave plate 212 may be circularly polarized. The polarization direction of the reference light L23 that has passed through the first quarter wave plate 212 again after being reflected by the reference mirror 214 may be changed from circularly polarized light to linearly polarized light. The reference light L23 may be rotated 90 degrees from the polarization direction of the reference light L21 reflected by the first polarizing beam splitter 210. Accordingly, since the reference light L23 re-incident on the first surface 210c of the first polarizing beam splitter 210 becomes P-polarized light (Z direction component), the reference light L23 may pass through the first polarizing beam splitter 210 and then may be emitted through a third surface 210d opposite to the first surface 210c of the first polarizing beam splitter 210.

The reference light L23 emitted through the third surface 210d of the first polarizing beam splitter 210 may be incident on the right-angle prism 230, and the reference light L23 reflected by the right angle prism 230 may be incident to the light detector.

As illustrated in FIGS. 4 and 5, the measurement light L11 passing through the first polarizing beam splitter 210 may be emitted from the second surface 210b adjacent to the first surface 210c of the first polarizing beam splitter 210, and may be incident on the second polarizing beam splitter 220.

The second polarizing beam splitter 220 may be arranged to reflect the measurement light L11 passing through the first polarizing beam splitter 210 onto the wafer surface W (the first measurement surface). A second polarization splitting plane of the second polarizing beam splitter 220 may arranged to have a second incident plane (eg, parallel to the YZ plane) orthogonal to a first incident plane (eg, parallel to the XZ plane) that is perpendicular to the first polarization splitting plane of the first polarizing beam splitter 210 and is coincident with the light propagation direction. The second incident plane may be perpendicular to the second polarization splitting plane of the second polarizing beam splitter 220, and may be perpendicular to the vibration direction (X direction) of the measurement light L11 (S polarized light) incident on the second polarization splitting plane. Accordingly, the propagation direction of the light reflected by the first polarizing beam splitter 210 and the propagation direction of the light reflected by the second polarizing beam splitter 220 may be orthogonal to each other. With respect to the arrangement relationship between the first and second polarizing beam splitters 210 and 220, it may be said that the second incident plane of the second polarizing beam splitter 220 and the first incident plane of the first polarizing beam splitter 220 may be arranged orthogonally to each other.

The second polarizing beam splitter 220 may reflect the measurement light L11 (S-polarized light) incident from the first polarizing beam splitter 210 onto the wafer surface W (the first measurement surface). The measurement light L11 reflected by the inclined surface 221 as the second polarization splitting surface of the second polarizing beam splitter 220 may be emitted through the first surface 220c of the second polarizing beam splitter 220 and may be incident on the wafer surface W (first measurement surface) past the second quarter wave plate 222. The measurement light L12 reflected by the wafer surface W may pass through the second quarter wave plate 222 and may be re-incident on the first surface 220c of the second polarizing beam splitter 220.

The second quarter wave plate 222 may change the polarization state of the light passing therethrough, similarly to the first quarter wave plate 212. The second quarter wave plate 222 may delay the phase of the light passing therethrough. The second quarter wave plate 222 may be selected such that a phase delay difference of (n+½) π occurs at the first wavelength (where n is an integer). The axis of the second quarter wave plate 222 may be installed to rotate by 45° (−45°).

The second quarter wave plate 222 may delay the phase of the passing light by 90°. The measurement light L12 passing through the second quarter wave plate 222 may be circularly polarized. The polarization direction of the measurement light L13 that has passed through the second quarter wave plate 222 again after being reflected by the wafer surface W may be rotated 90 degrees from the polarization direction of the measurement light L11 reflected by the second polarizing beam splitter 220. Accordingly, since the measurement light L13 re-incident on the first surface 210c of the second polarizing beam splitter 220 becomes P-polarized light (Z direction component), the measurement light L13 may pass through the second polarizing beam splitter 220 and then may be emitted through the third surface 220d of the second polarizing beam splitter 220.

The measurement light L13 emitted through the third surface 220d of the second polarizing beam splitter 220 may pass through the third quarter wave plate 224 and then may be incident on the die surface D (second measurement surface). The measurement light L15 reflected by the die surface D may pass through the third quarter wave plate 224 and then may be re-incident on the third surface 220d of the second polarizing beam splitter 220.

The third quarter wave plate 224 may change the polarization state of the light passing therethrough, similarly to the first and second quarter wave plates 212 and 222. The third quarter wave plate 224 may delay the phase of the light passing therethrough. The third quarter wave plate 224 may be selected such that a phase delay difference of (n+½) π occurs at the first wavelength (where n is an integer). The axis of the third quarter wave plate 224 may be installed to rotate by 45° (−45°).

The third quarter wave plate 224 may delay the phase of the passing light by 90°. The measurement light L14 passing through the third quarter wave plate 224 may be circularly polarized. The polarization direction of the measurement light L15 passing through the third quarter wave plate 224 again after being reflected by the die surface D may be rotated 90 degrees from the polarization direction of the measurement light L13 passing through the second polarizing beam splitter 220. Accordingly, the measurement light L15 re-incident to the third surface 210d of the second polarizing beam splitter 220 becomes S-polarized light (X direction component), the measurement light L15 may be reflected by the second polarizing beam splitter 220 and then may be emitted through the second surface 220b of the polarizing beam splitter 220.

The measurement light L15 reflected by the second polarizing beam splitter 220 may be emitted through the second surface 220b of the second polarizing beam splitter 220 and then, may be incident on the mirror 228 past the fourth quarter wave plate 226. The measurement light L17 reflected by the reflection mirror 228 may pass through the fourth quarter wave plate 226 and then may be re-incident on the second surface 220b of the second polarizing beam splitter 220.

The fourth quarter wave plate 226 may change the polarization state of the light passing therethrough, similarly to the first to third quarter wave plates 212, 222 and 224. The fourth quarter wave plate 226 may delay the phase of the light passing therethrough. The fourth quarter wave plate 226 may be selected such that a phase delay difference of (n+½) π occurs at the first wavelength (where n is an integer). The axis of the fourth quarter wave plate 226 may be installed to rotate by 45° (−45°).

The fourth quarter wave plate 226 may delay the phase of the passing light by 90°. The measurement light L16 passing through the fourth quarter wave plate 226 may be circularly polarized. The polarization direction of the measurement light L17 that has passed through the fourth quarter wave plate 228 again after being reflected by the reflection mirror 228 may be rotated 90 degrees from the polarization direction of the measurement light L15 reflected by the second polarizing beam splitter 220. Accordingly, since the measurement light L17 re-incident on the second surface 210b of the second polarizing beam splitter 220 becomes P-polarized light (Y direction component), the measurement light L17 may pass through the second polarizing beam splitter 220 and then be incident on the second surface 210b of the first polarizing beam splitter 210.

Since the measurement light L17 incident on the second surface 210b of the first polarizing beam splitter 210 is in the S-polarization direction (Y direction component), the measurement light L17 may be reflected by the first polarizing beam splitter 210 and then may be emitted through the third surface 210d of the beam splitter 210.

The measurement light L17 emitted through the third surface 210d of the first polarizing beam splitter 210 may be incident on the right-angle prism 230, and the measurement light L17 reflected by the right-angle prism 230 may be incident to the first light detector.

The first light detector may include a first polarizer 300 and a first photo detector 310. The first polarizer 300 may interfere the reference light L23 and the measurement light L17 emitted from the optical assembly 200 with each other. The first photo detector 310 may detect an interference signal of lights emitted from the first polarizer 300.

Since the polarization directions of the reference light L23 and the measurement light L17 reflected by the right-angle prism 230 are 90° different from each other, interference may not occur. The reference light L23 and the measurement light L17 may pass through the first polarizer 300 rotated by 45° to interfere with each other. The first photo detector 310 may include a 2D imaging device for detecting an interference fringe between the reference light L24 and the measurement light L18 passing through the first polarizer 300.

A measurement range and resolution of the first photo detector 310 that detects the interference fringe may be determined in consideration of the first wavelength, a beam size of the first light, a pixel size of the 2D imaging device, and the like. For example, the first photo detector 310 may measure parallelism with the resolution of 0.0002 degrees in the measurement range within ±1 degrees.

As described above, the optical assembly 200 of the parallelism measurement optical apparatus may include the first and second polarizing beam splitters 210 and 220, four quarter wave plates 212, 222, 224 and 226 and three mirrors 214, 228 and 230. The first light L1 incident on the optical assembly 200 may be divided into the measurement light L11 and the reference light L21, and the measurement light L11 may be sequentially reflected on the wafer surface W and the die surface D and then may be emitted from the optical assembly 200.

Accordingly, the measurement light L17 emitted from the optical assembly 200 may have information on an inclination of the die surface D with respect to the wafer surface W, and the interference fringe between the reference light and the measurement light may be analyzed to determine the inclination of the die surface D with respect to the wafer surface W.

Further, when the wafer surface is flat, the parallelism measurement optical apparatus may measure the deformation of the die surface D through the interference fringe.

Further description of detection of deformation of the die surface D will now be provided. As background a comparative example parallelism of chip-substrates is measured before bonding, but parallelism measurements are distorted by instrument tilt and die deformation degrades the resulting bonded product. No interfering fringe is produced. Die deformation is not directly measured and measurement tilt adds errors to the parallelism measurements.

In contrast, an example embodiment uses a light source producing coherent light, optics including a polarized beamsplitter, quarter wave plates, mirrors and a detector including a polarizer and a 2D detector. Before bonding, embodiments measure the parallelism between die-wafers to match each other. Some embodiments check a deformation of the die to make the die an optimized shape for bonding. Thus embodiments provide measurement of both die-wafer parallelism and die deformation. Also, sensitivity to tilt is either eliminated or detected to improve the parallelism measurements so that the parallelism measurements are not affected by instrument tilt.

Thus, provided herein is a method of bonding a die (FIG. 2 item D) to a wafer (FIG. 2 item W) using a die bonding system (FIG. 1 item 10), the method including simultaneously measuring, using an optical apparatus (FIG. 1 item 200, FIG. 2 item 200, FIG. 9 item 200) of the die bonding system, a parallelism between the die and the wafer and a deformation of the die. In some embodiments, the die is held by an upper support structure (FIG. 1 item 30) of the die bonding system and the wafer is held by a lower support structure (FIG. 1 item 20) of the die bonding system, and wherein the parallelism and deformation are detected using interference fringes (see for example, FIGS. 15A, 15B, 15C, 15D) produced by the optical apparatus. Some embodiments correct a tilt of the die with respect to the wafer. Some embodiments also make the die, based on the measured deformation, an improved shape. Finally the die is bonded to the wafer with improved control of the deformation of the die and improved parallelism between the die and wafer.

Figure 6:
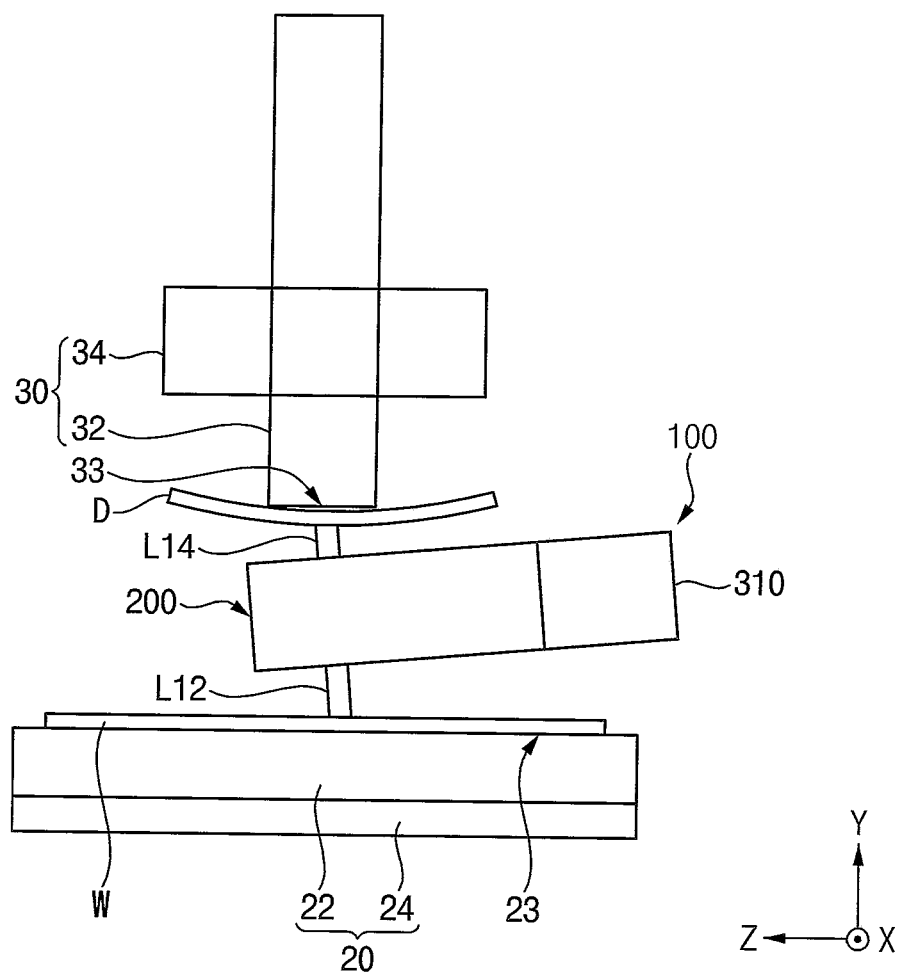
Figure 7A:
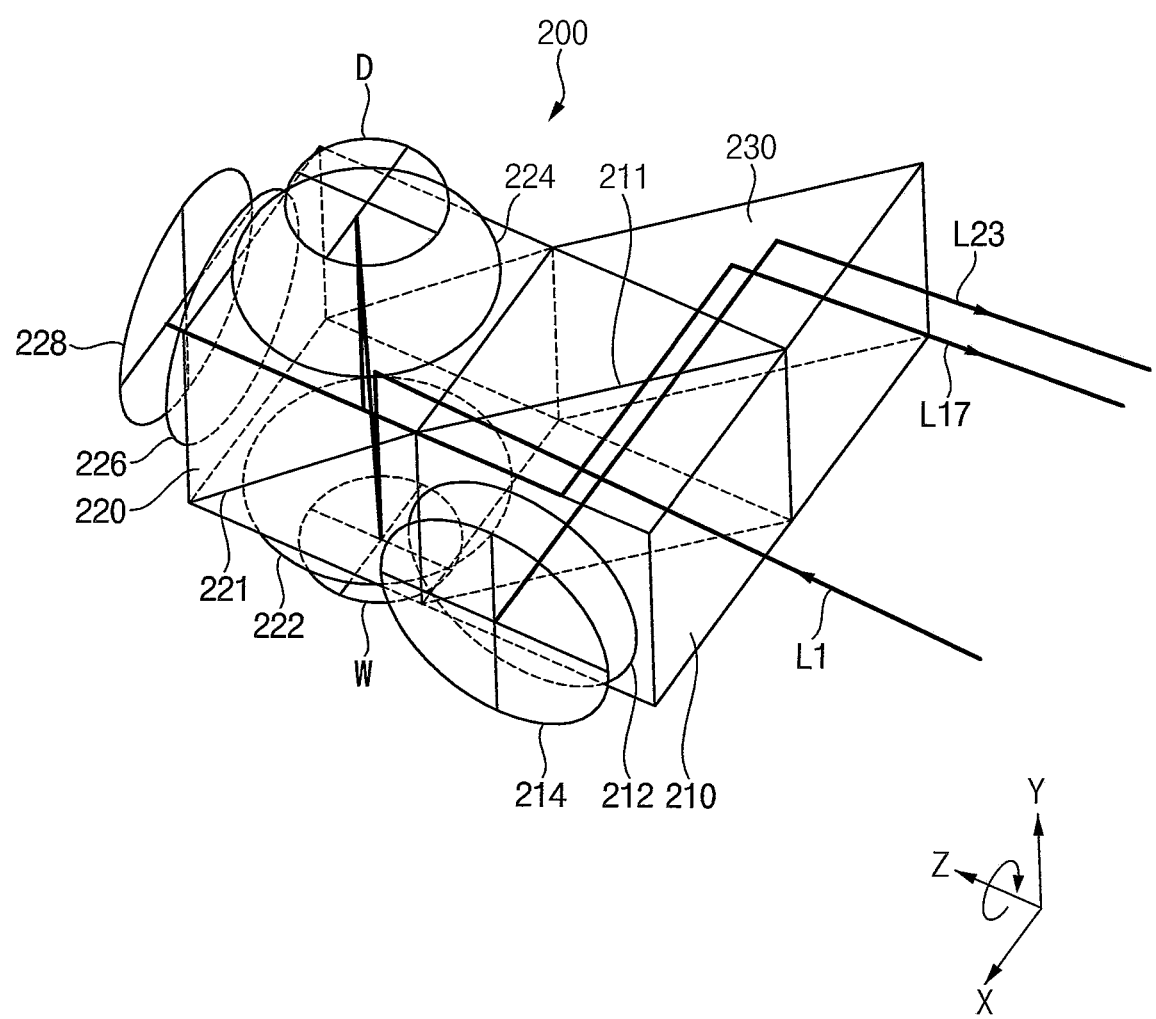
FIGS. 7A and 7B are views illustrating a state in which the optical assembly of FIG. 6 is rotated about the Z direction.
Figure 7B:
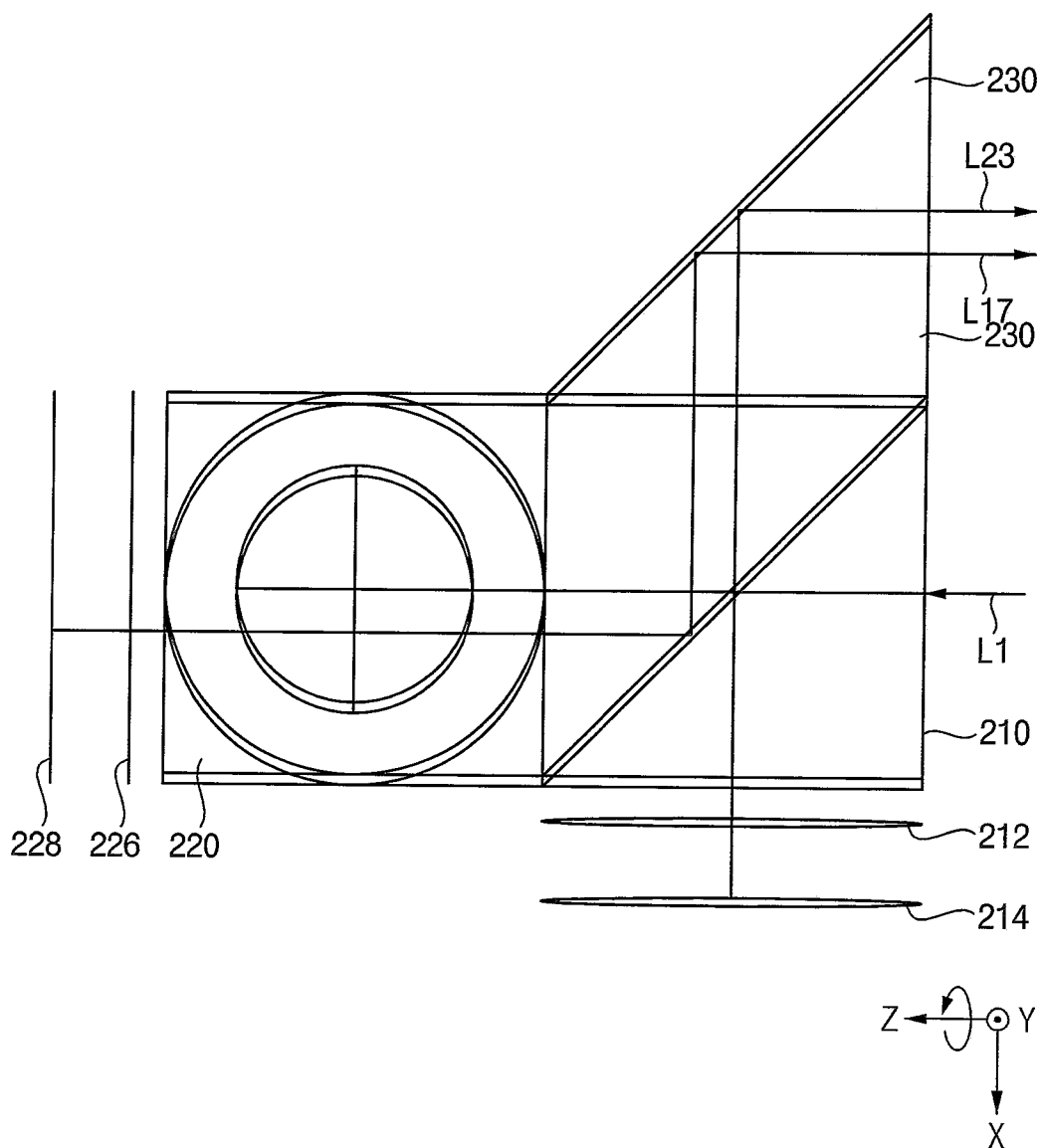

FIG. 6 is a cross-sectional view illustrating a state in which an optical assembly is tilted when parallelism between a wafer and a die is measured using the optical apparatus of FIG. 1. FIGS. 7A and 7B are views illustrating a state in which the optical assembly of FIG. 6 is rotated about the Z direction.

Referring to FIGS. 6 to 7B, inclination information between the wafer surface and the die surface may be obtained from an interference fringe between the reference light L23 reflected from the inside of the optical assembly 200 and the measurement light L17 reflected from the wafer surface and the die surface. When the interference fringe is observed in a tilted state of the optical assembly, it can be confirmed that only a lateral shift occurs between the reference light L23 and the measurement light L17 and there is no change in the relative angle therebetween. Since the number of fringes at a certain distance is determined by the angle between the lights, the parallelism between the wafer surface and the die surface may be measured regardless of the tilt of the optical assembly 200.

As illustrated in FIGS. 7A and 7B, when the wafer surface and the die surface are parallel to each other in a state in which the optical assembly 200 is rotated about the Z direction. It can be seen that the relative angle between the reference light L23 emitted from the optical assembly 200 and the measurement light L17 is maintained parallel to each other. Accordingly, it can be seen that the number of interference fringes of the reference light and the measurement light is not affected by the tilt of the optical assembly 200. Therefore, even when the optical assembly 200 is tilted, the parallelism between the wafer surface and the die surface may be measured.

Figure 8A:
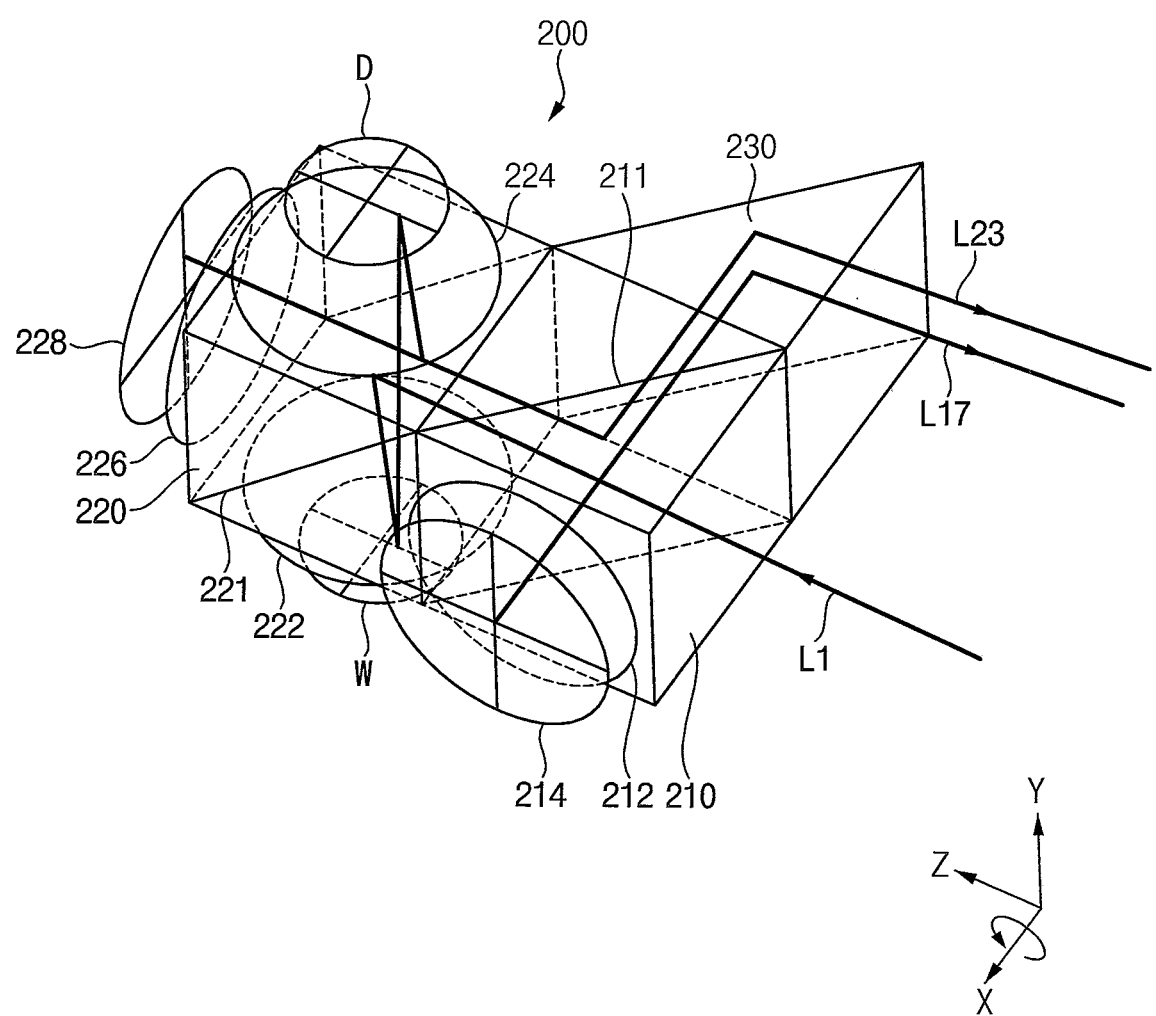
FIGS. 8A and 8B are views illustrating a state in which the optical assembly of FIG. 6 is rotated about the X direction.
Figure 8B:
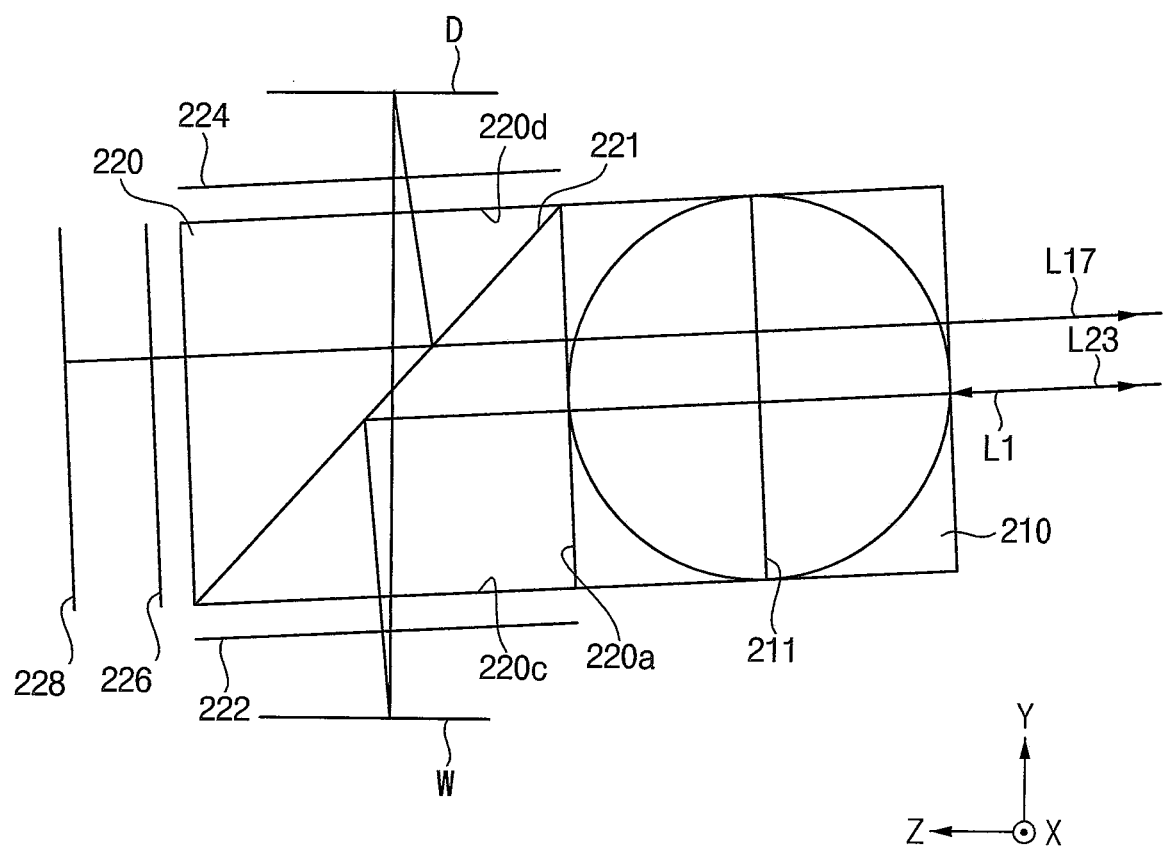

FIGS. 8A and 8B are views illustrating a state in which the optical assembly of FIG. 6 is rotated about the X direction.

As illustrated in FIGS. 8A and 8B, when the wafer surface and the die surface are parallel to each other in a state in which the optical assembly 200 is rotated about the X direction, it can be seen that the relative angle between the reference light L23 emitted from the optical assembly 200 and the measurement light L17 is maintained parallel to each other. Accordingly, even when the optical assembly 200 is tilted, the parallelism between the wafer surface and the die surface may be measured.

Figure 9:
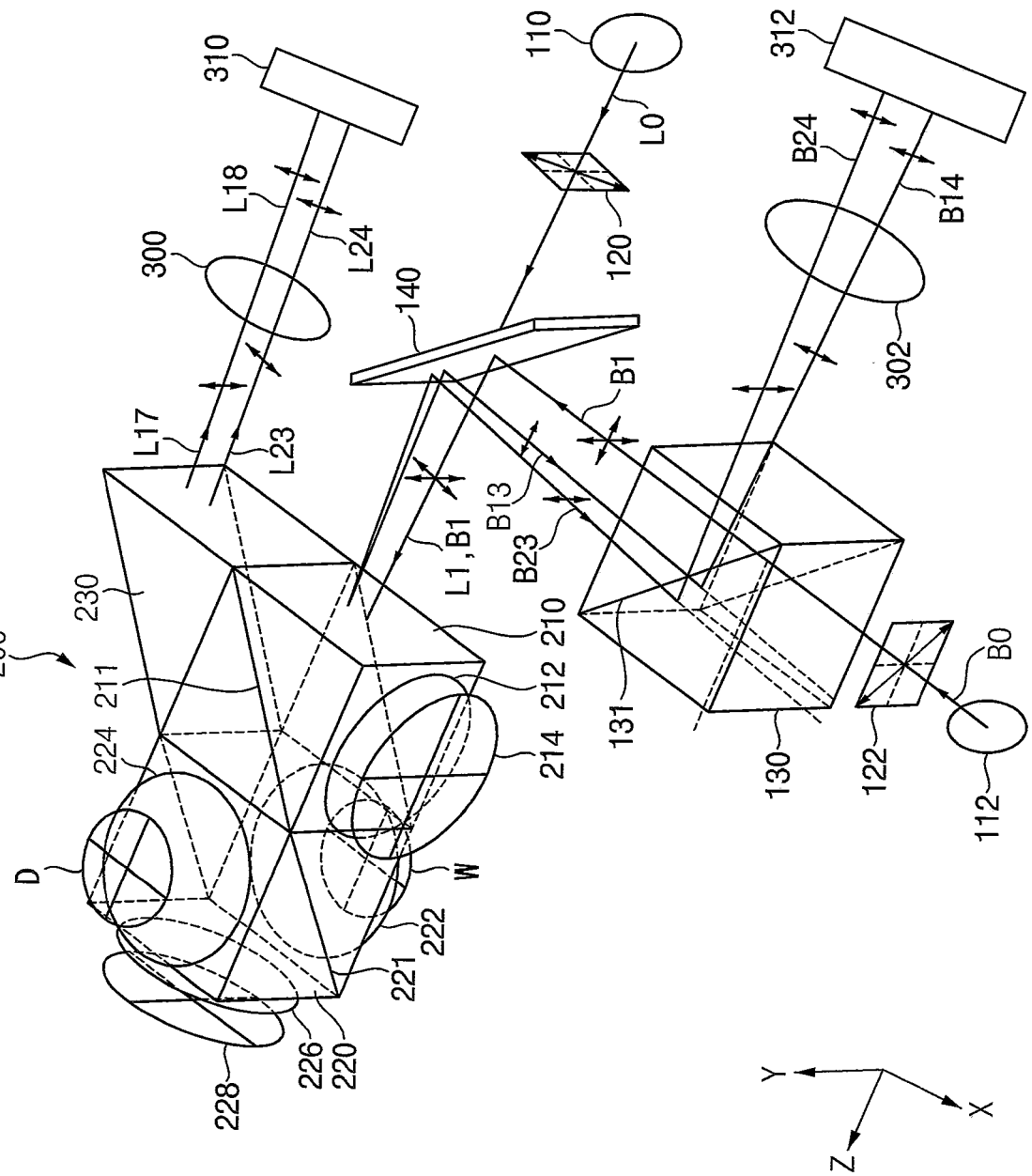
Figure 10:
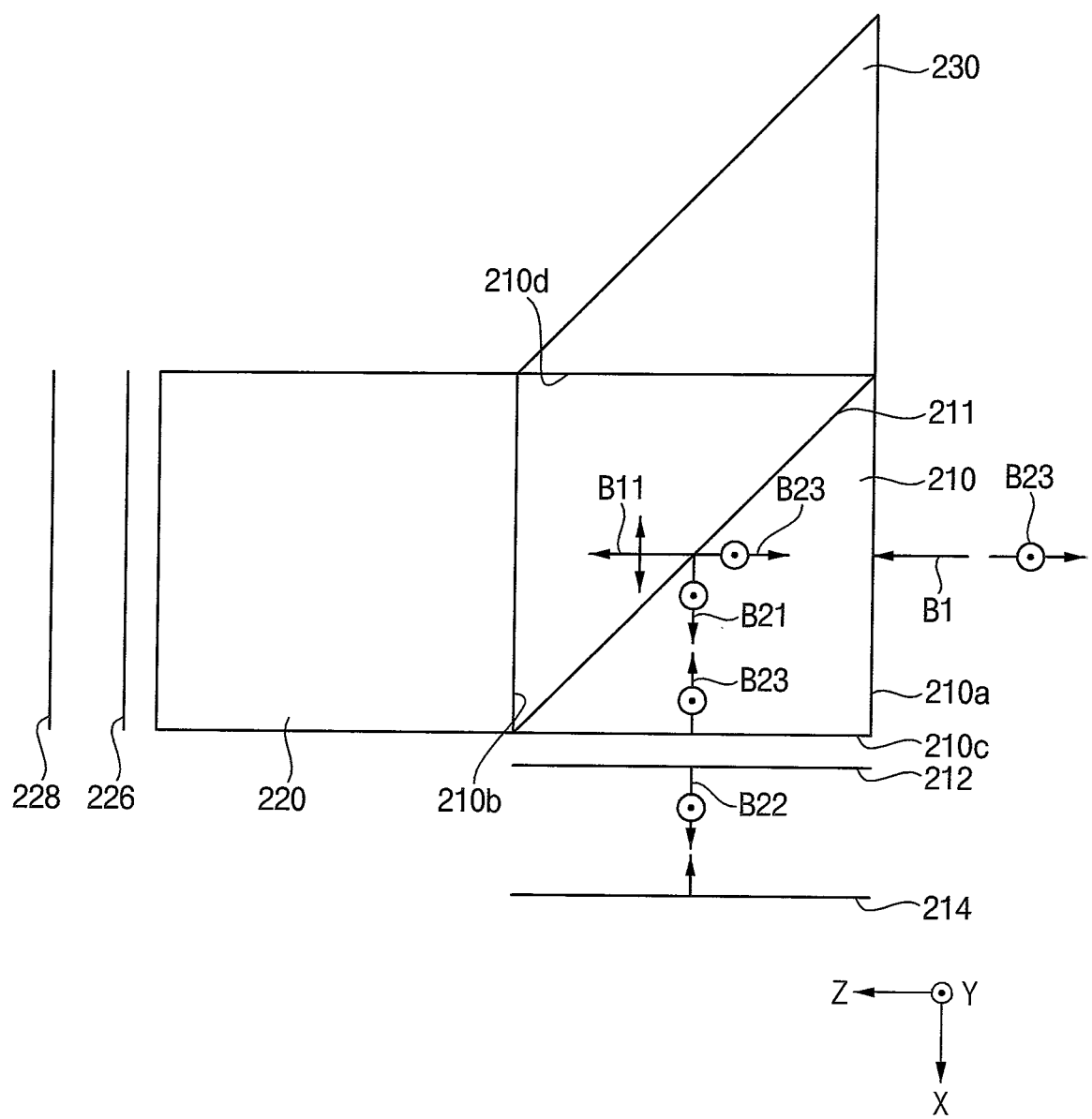
Figure 11:
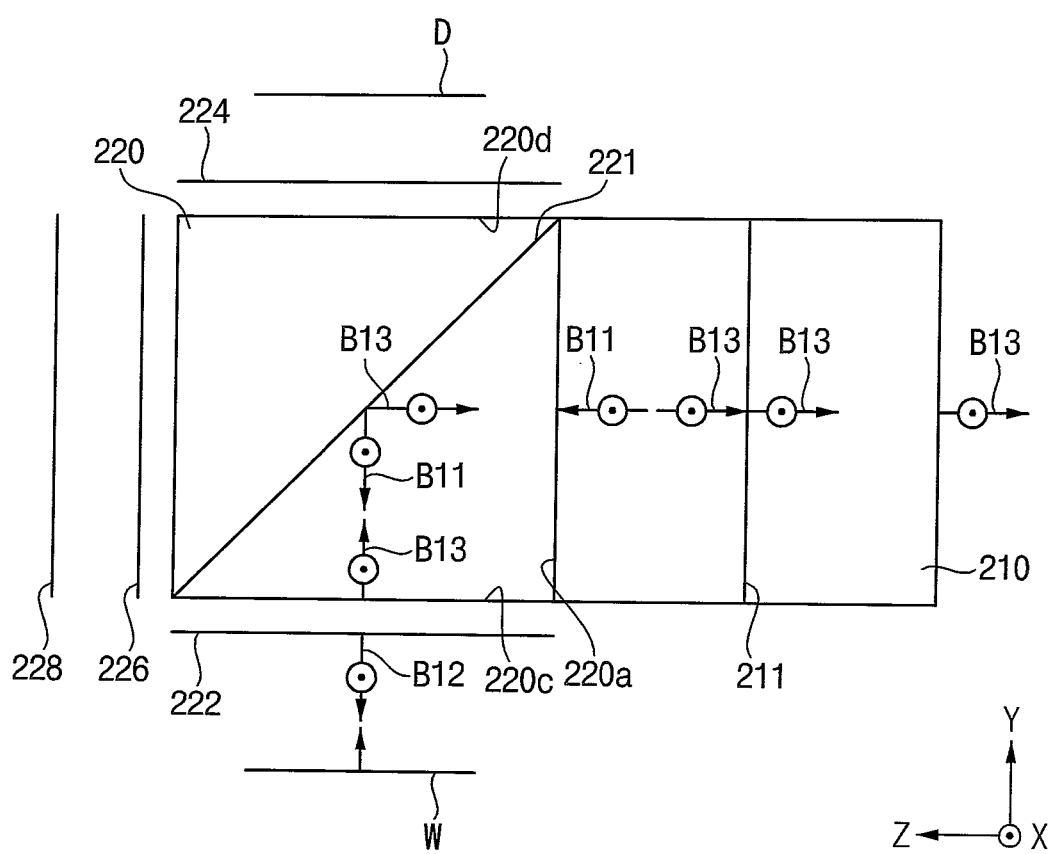
Figure 12:
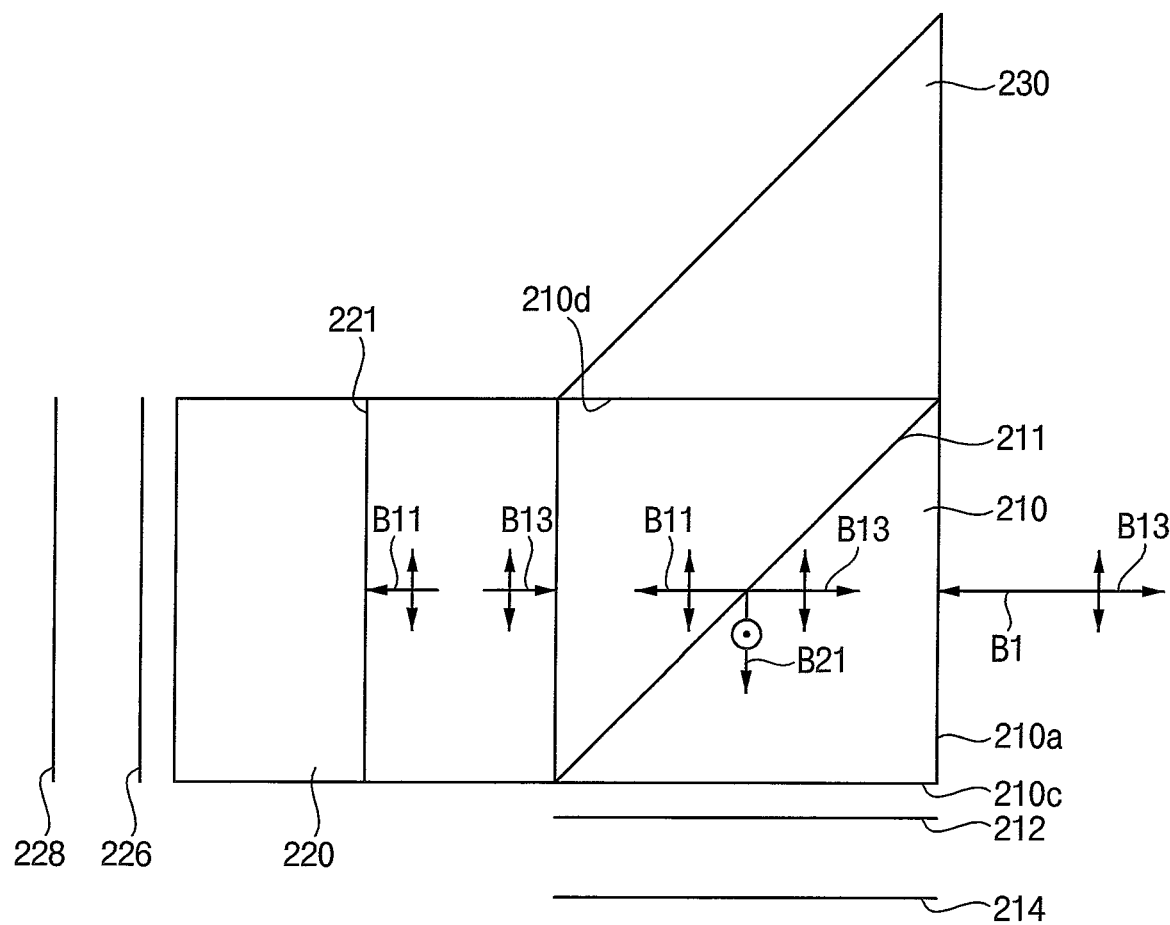
Figure 13:
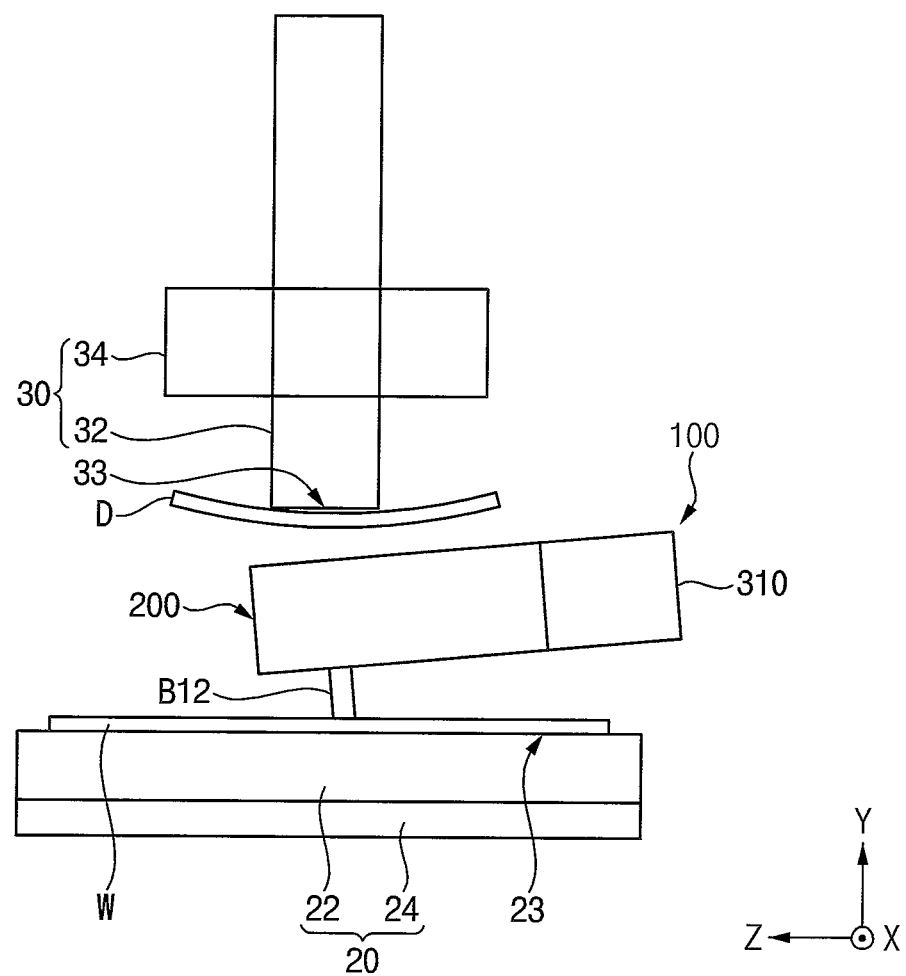

FIG. 9 is a view illustrating a parallelism measurement optical apparatus in accordance with example embodiments. FIG. 10 is a plan view illustrating an optical path of a second reference light separated from a second incident light by an optical assembly of the parallelism measurement optical apparatus in FIG. 9. FIG. 11 is a front view illustrating an optical path of a second measurement light separated from the second incident light by the optical assembly of the parallelism measurement optical device in FIG. 9. FIG. 12 is a plan view of FIG. 11. FIG. 13 is a cross-sectional view illustrating a state in which a degree of tilt of the parallelism measurement optical apparatus including the optical assembly is measured using the parallelism measurement optical apparatus in FIG. 9. The parallelism measurement optical apparatus may be substantially the same as or similar to the optical apparatus for measuring parallelism described with reference to FIGS. 2 to 5 except for additional arrangements of optical components related with a second light for measuring tilt of the optical apparatus. Thus, same reference numerals will be used to refer to the same or like elements and any further repetitive explanation concerning the above elements will be omitted.

Referring to FIGS. 9 to 12, a parallelism measurement optical apparatus may include a first illuminator, a second illuminator, an optical assembly 200, a first light detector and a second light detector.

In example embodiments, the first illuminator may include a first light source 110 and a linear polarizer 120, and the second illuminator may include a second light source 112 and a second linear polarizer 122, a beam splitter 130 and a band pass filter 140. The first light source 110 may generate a first light L0 having a first wavelength 1, and the second light source 112 may generate a second light B0 having a second wavelength λ2 different from the first wavelength. For example, the first and second light sources 110 and 112 may generate a coherent light, respectively. The lights L0 and B0 irradiated from the first and second light sources 110 and 112 may be converted into parallel light through a collimating lens. The parallel light may have a diameter of several millimeters to several tens of millimeters (mm).

The first light L0 irradiated from the first light source 110 may be linearly polarized in a 45° direction by the first linear polarizer 120, and the linearly polarized first light L1 may pass through the band pass filter and then may be incident to the optical assembly 200 in the first direction (Z direction). The second light B0 irradiated from the second light source 112 may be linearly polarized in a 45° direction by the second linear polarizer 122, and the linearly polarized second light B1 may pass through the beam splitter 130 and then may be reflected by the band pass filter 140 to be incident on the optical assembly 200 in the first direction (Z direction). The band pass filter 140 may transmit the first light L1 having the first wavelength and may reflect the second light B1 having the second wavelength.

Each of the first light L1 and the second light B1 passing through the first and second linear polarizers 120 and 122 may be a synthetic light including a vertical polarization component (Y direction component) and a horizontal polarization component (X direction component).

In example embodiments, the optical assembly 200 may divide the incident first light L1 into a first reference light and a first measurement light, and may direct the first measurement light to be sequentially incident on a wafer surface (first measurement surface) and a die surface (second measurement surface) and emit lights that are reflected from the first and second measurement surfaces and re-incident on the optical assembly 200. The optical assembly 200 may divide the incident second light B1 into a second reference light and a second measurement light, may direct the second measurement light to be incident on the wafer surface (first measurement surface) and emit light that is reflected from the first measurement surface and re-incident on the optical assembly 200.

As illustrated in FIG. 10, the first polarizing beam splitter 210 may split the incident second light B1 into the second measurement light B11 and the second reference light B21. The first polarizing beam splitter 210 may transmit the X direction (second direction) component and reflect the Y direction (third direction) component. The second measurement light B11 may include P-polarized light of the second light B1 that has passed through the first polarizing beam splitter 210, and the second reference light B21 may include S-polarized light of the second light B1 reflected by the inclined surface 211.

The second measurement light B11 passing through the first polarizing beam splitter 210 may be incident on the second polarizing beam splitter 220. The second reference light B21 reflected by the first polarizing beam splitter 210 may be emitted through the first surface 210c of the first polarizing beam splitter 210 and may be incident on the reference mirror 214 past the first quarter wave plate 212. The reference light B22 reflected by the reference mirror 214 may pass through the first quarter wave plate 212 and may be re-incident on the first surface 210c of the first polarizing beam splitter 210.

The first quarter wave plate 212 may change the polarization state of the light passing therethrough. The first quarter wave plate 212 may delay the phase of the light passing therethrough. The first quarter wave plate 212 may be selected such that a phase delay difference of $(n+\frac{1}{2})\pi$ occurs at the first wavelength (where n is an integer). The first quarter wave plate 212 may be selected such that a phase delay difference of $(m+1)\pi$ occurs at the second wavelength (where m is an integer). The axis of the first quarter wave plate 212 may be installed to rotate by 45° (−45°).

For example, the first wavelength λ1 of the first light and the second wavelength λ2 of the second light may be selected in consideration of the wavelength delay characteristic of the first quarter wave plate. For a specific product A, the first wavelength may be 532 nm and the second wavelength may be 1,064 nm. For a specific product B, the first wavelength may be 633 nm and the second wavelength may be 622.5 nm or 603 nm.

The first quarter wave plate 212 may delay the phase of the passing second light by 180°. The polarization direction of the second reference light B23 that has passed through the first quarter wave plate 212 twice may be the same as the polarization direction of the second reference light B21 reflected by the first polarizing beam splitter 210. Accordingly, since the second reference light B23 re-incident to the first surface 210c of the first polarizing beam splitter 210 becomes S-polarized light (Y direction component), the second reference light B23 may be reflected by the first polarizing beam splitter 210 and then may be emitted through a fourth surface 210a opposite to the second surface 210b.

The second reference light B23 emitted through the fourth surface 210a of the first polarizing beam splitter 210 may be reflected by the band pass filter 140 and the beam splitter 130 and then may be incident on the second light detector.

As illustrated in FIGS. 11 and 12, the second measurement light B11 passing through the first polarizing beam splitter 210 may be emitted through the second surface 210b of the first polarizing beam splitter 210, and may be incident on the polarizing beam splitter 220.

The second polarizing beam splitter 220 may reflect the second measurement light B11 (S-polarized light) incident from the first polarizing beam splitter 210 onto the wafer surface W (first measurement surface). The second measurement light B11 reflected by the second polarizing beam splitter 220 may be emitted through the first surface 220c of the second polarizing beam splitter 220 and may be incident on the wafer surface W (first measurement surface) past the second quarter wave plate 222. The measurement light B12 reflected by the wafer surface W may pass through the second quarter wave plate 222 and be re-incident on the first surface 220c of the second polarizing beam splitter 220.

The second quarter wave plate 222 may change the polarization state of the light passing therethrough, similarly to the first quarter wave plate 212. The second quarter wave plate 222 may delay the phase of the light passing therethrough. The second quarter wave plate 222 may be selected such that a phase delay difference of $(n+\frac{1}{2})\pi$ occurs at the first wavelength (where n is an integer). The second quarter wave plate 222 may be selected such that a phase delay difference of $(m+1)\pi$ occurs at the second wavelength (where m is an integer). The axis of the second quarter wave plate 222 may be installed to rotate by 45° (−45°).

The second quarter wave plate 222 may delay the phase of the passing second light by 180°. The polarization direction of the second measurement light B13 that has passed through the second quarter wave plate 222 twice may be the same as the polarization direction of the second measurement light B11 reflected by the second polarizing beam splitter 220. Accordingly, since the second measurement light B13 re-incident on the first surface 220c of the second polarizing beam splitter 220 becomes S-polarized light (X direction component), the second measurement light B13 may be reflected by the second polarizing beam splitter 220 and then may be incident on the second surface 210b of the polarizing beam splitter 210.

Since the second measurement light B13 incident on the second surface 210b of the first polarizing beam splitter 210 is P-polarized light (X direction component), the second measurement light B13 may pass through the first polarizing beam splitter 210 and then may be emitted through the fourth surface 210a of the first polarizing beam splitter 210.

The second measurement light B13 emitted through the fourth surface 210a of the first polarizing beam splitter 210 may be reflected by the band pass filter 140 and the beam splitter 130 and then may be incident on the second light detector.

In example embodiments, the first light detector may include a first polarizer 300 and a first photo detector 310, and the second light detector may include a second polarizer 302 and a second photo detector 312.

The first polarizer 300 may interfere the first reference light L23 and the first measurement light L17 emitted from the optical assembly 200 with each other. The first photo detector 310 may detect an interference signal of lights emitted from the first polarizer 300.

The second polarizer 302 may interfere the second reference light B23 and the second measurement light B13 emitted from the optical assembly 200 with each other. The second photo detector 312 may detect an interference signal of lights emitted from the second polarizer 302.

Since the polarization directions of the second measurement light B13 and the second reference light B23 emitted through the fourth surface 210a of the first polarizing beam splitter 210 are 90° different from each other, interference may not occur. The second reference light B23 and the second measurement light B13 may pass through the second polarizer 302 rotated by 45° to interfere with each other. The second photo detector 312 may include a 2D imaging device for detecting an interference fringe between the second reference light B24 and the second measurement light B14 passing through the second polarizer 302.

As illustrated in FIG. 13, by detecting the interference fringe between the second reference light B24 and the second measurement light B14 detected by the second photo detector 312, the degree of tilt of the parallelism measurement optical apparatus 100 including the optical assembly 200 with respect to the wafer surface, may be measured.

As described above, the second light B1 incident on the optical assembly 200 may be divided into the second measurement light B11 and the second reference light B21, and the second measurement light B11 may be reflected from the wafer surface W and then may be emitted from the optical assembly 200. Accordingly, the second measurement light B13 emitted from the optical assembly 200 have information on the wafer surface W, and the interference fringe between the second reference light and the second measurement light may be analyzed to determine the degree of tilt of the parallelism measurement optical apparatus 100 including the optical assembly 200 with respect to the wafer W surface.

Hereinafter, a method of bonding the die D onto the wafer W using the above-described die bonding system will be described.

Figure 14:
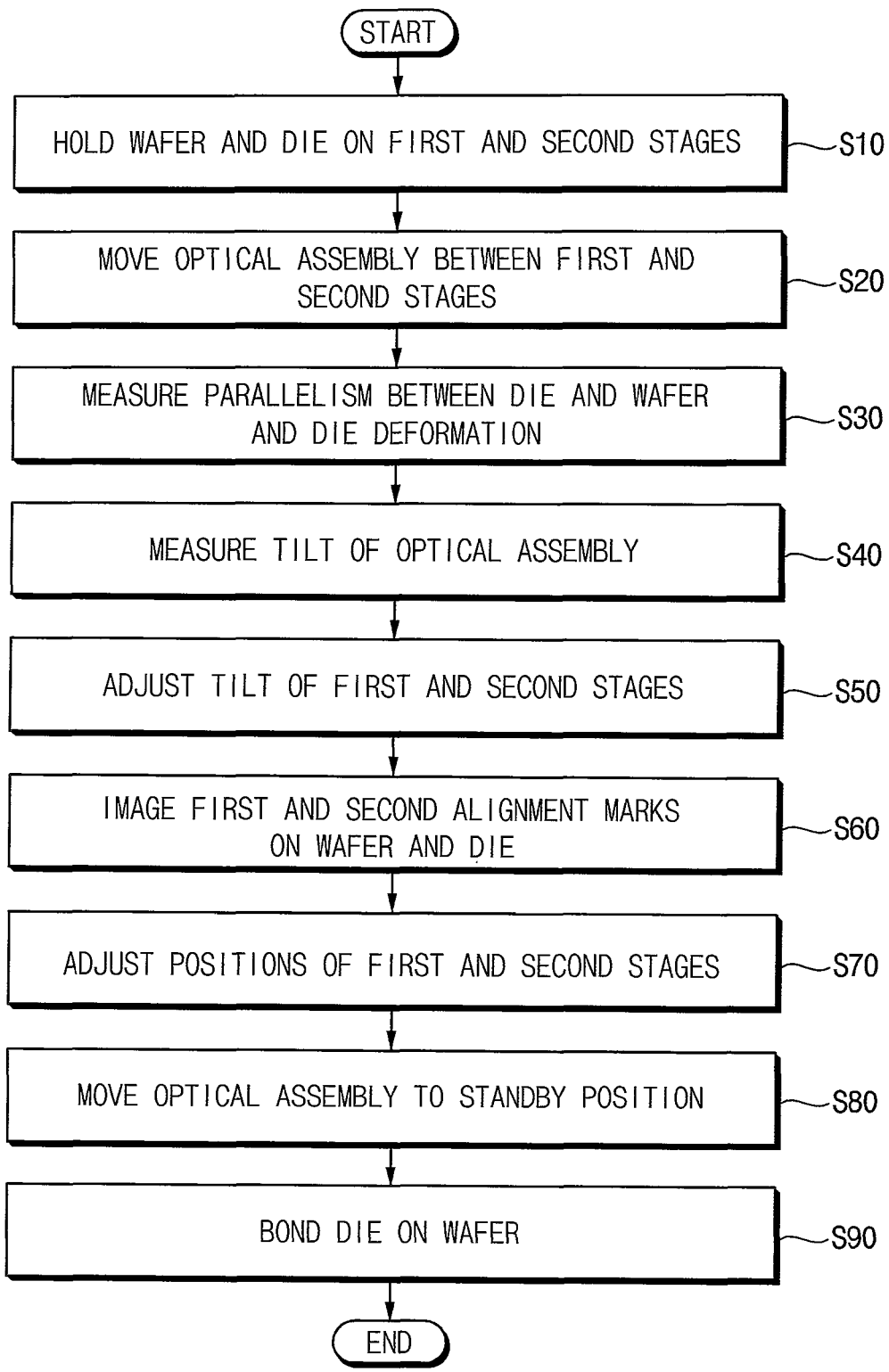
FIG. 14 is a flow chart illustrating a die bonding method in accordance with example embodiments.
Figure 16A:
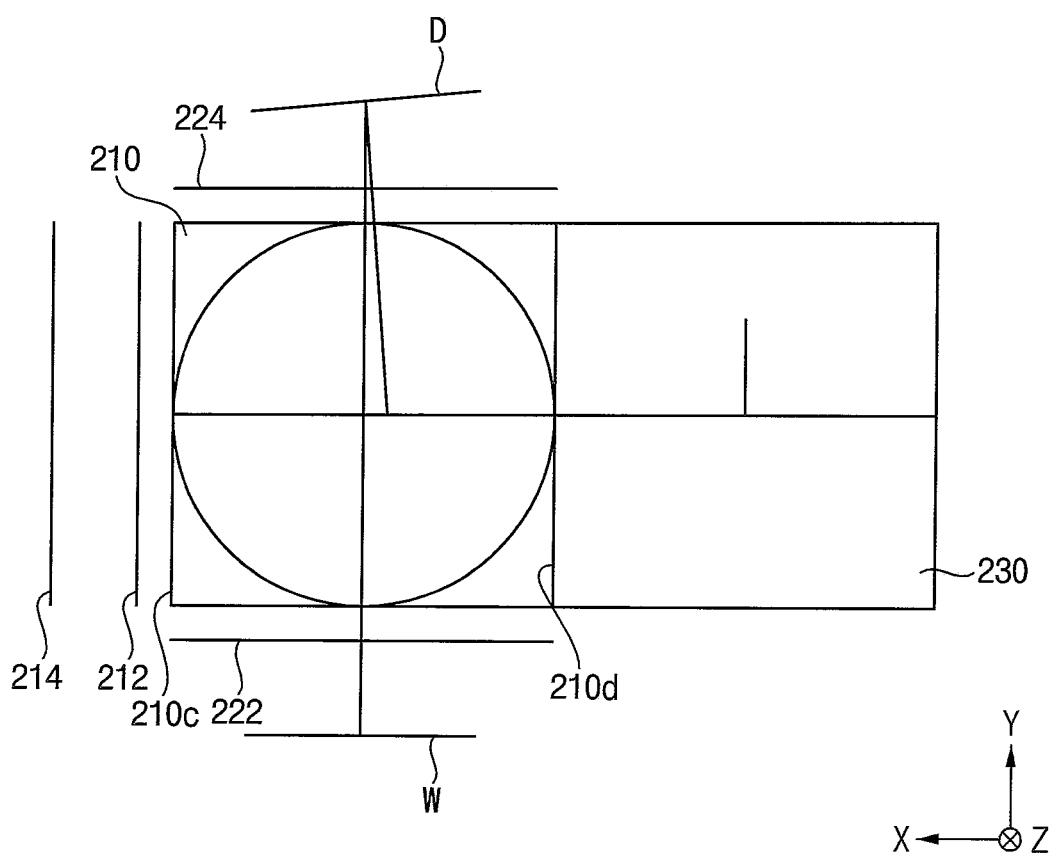
FIGS. 16A and 16B are views illustrating the optical assembly when there is a tilt between the die and the wafer in a state in which the optical assembly is not tilted.
Figure 16B:
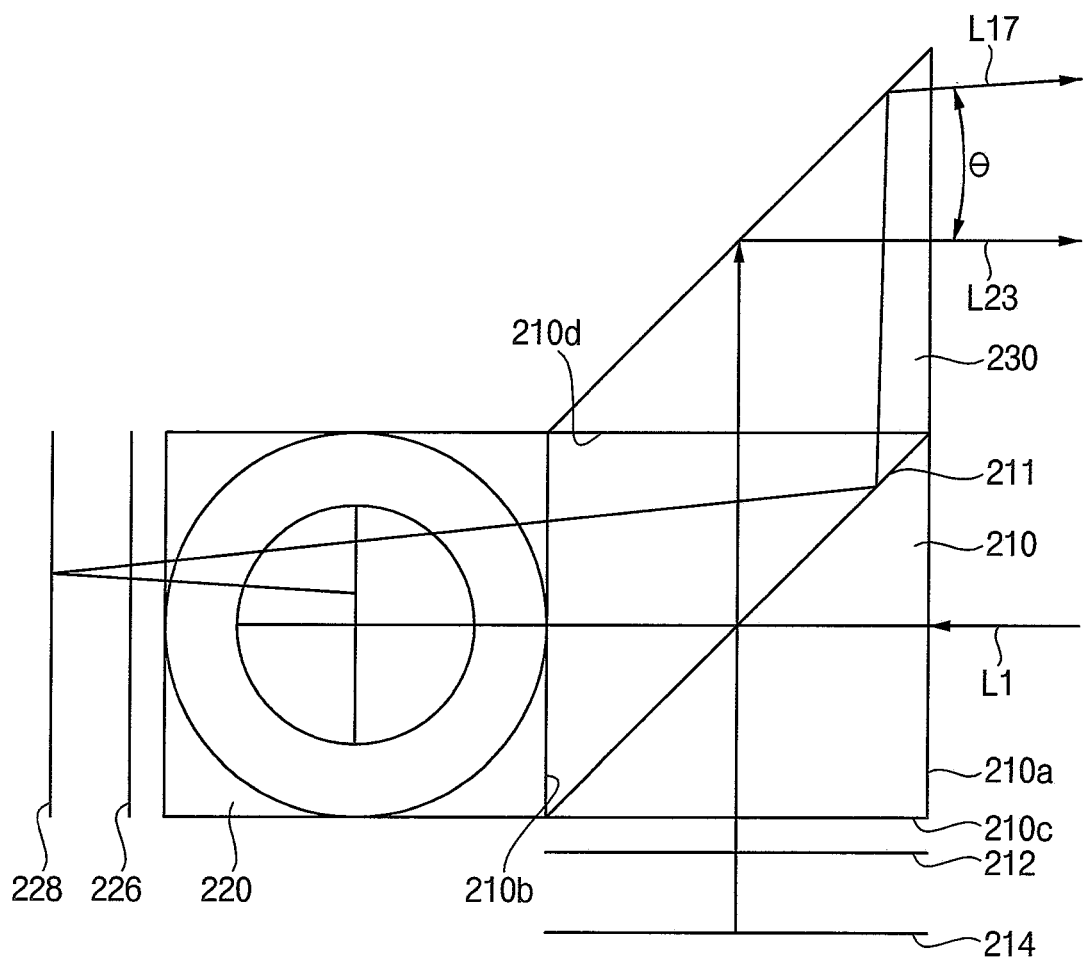
Figure 16C:
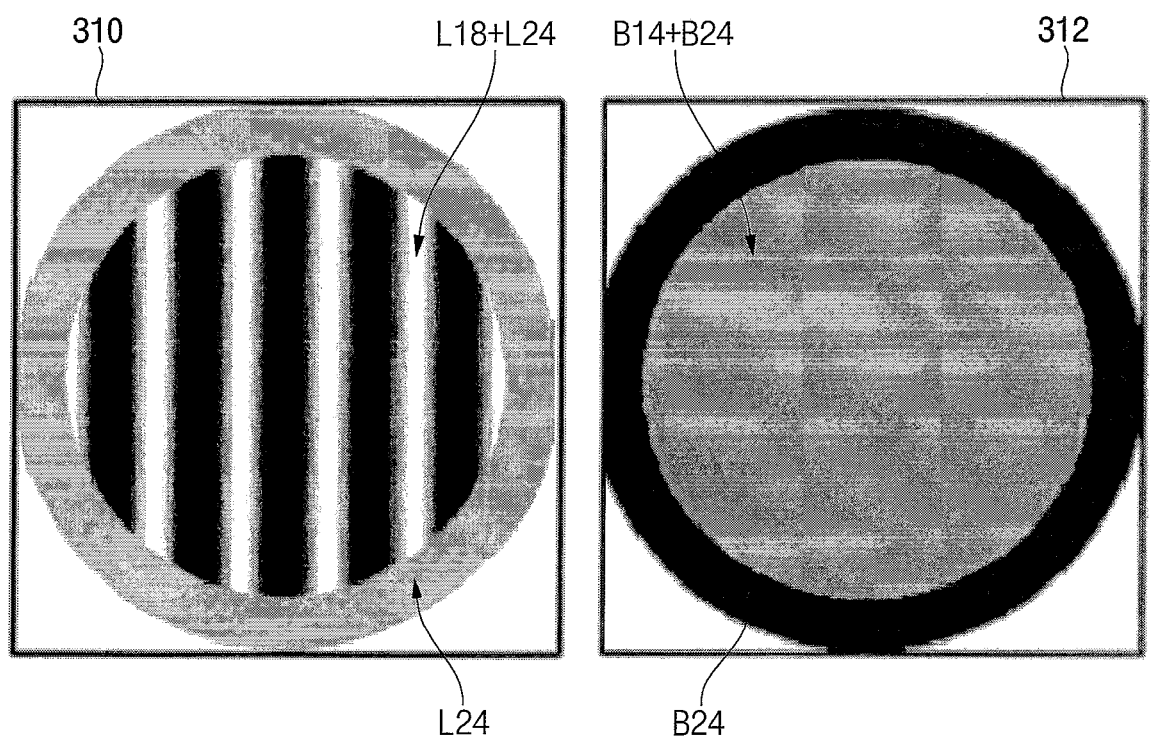
FIG. 16C is a view illustrating interference fringes detected by the optical assembly and the first and second photo detectors of FIGS. 16A and 16B.
Figure 17A:
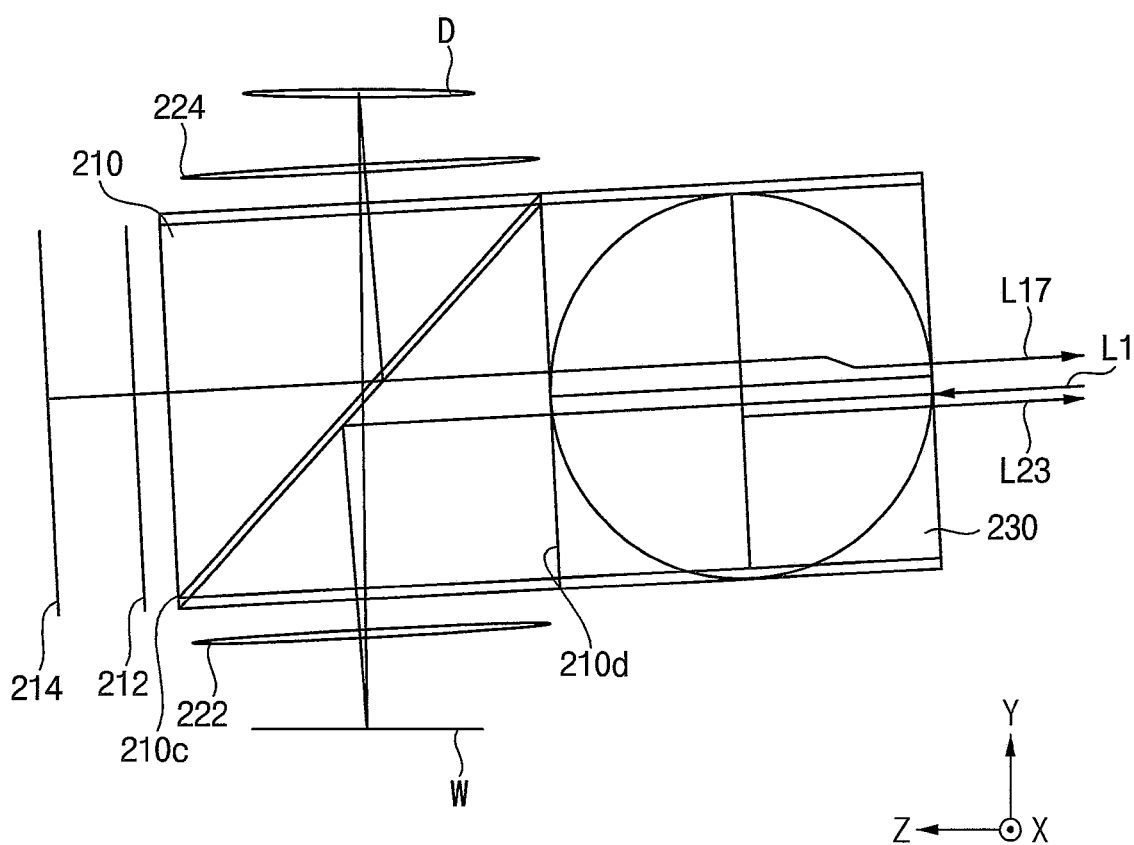
FIGS. 17A and 17B are views illustrating the optical assembly when there is a tilt between the wafer and the die in a state in which the optical assembly is tilted.
Figure 17B:
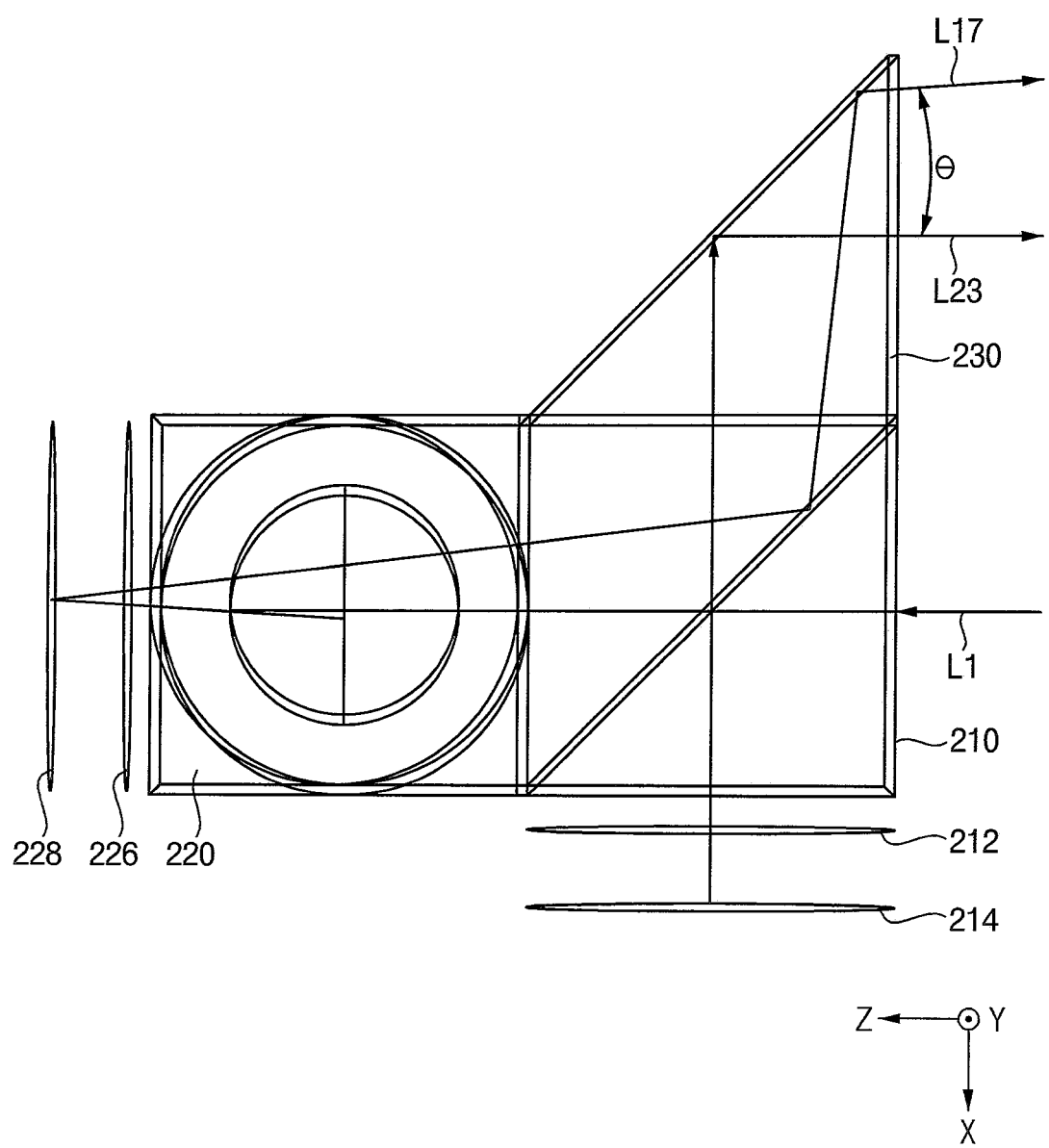
Figure 17C:
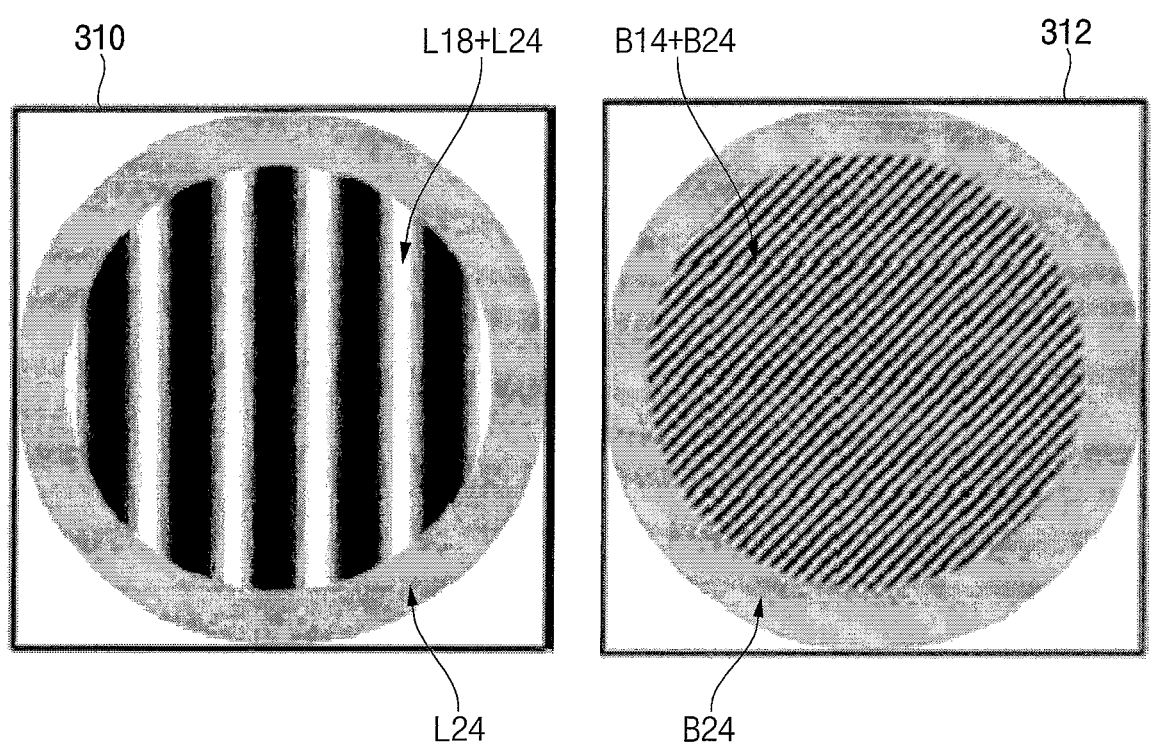
FIG. 17C is a view illustrating interference fringes detected by the optical assembly and the first and second photo detectors of FIGS. 17A and 17B.

FIG. 14 is a flow chart illustrating a die bonding method in accordance with example embodiments. FIGS. 15A to 15D are views illustrating interference fringes detected by a first photo detector. FIGS. 16A and 16B are views illustrating the optical assembly when there is a tilt between the die and the wafer in a state in which the optical assembly is not tilted, and FIG. 16C is a view illustrating interference fringes detected by the optical assembly and the first and second photo detectors of FIGS. 16A and 16B. FIGS. 17A and 17B are views illustrating the optical assembly when there is a tilt between the wafer and the die in a state in which the optical assembly is tilted, and FIG. 17C is a view illustrating interference fringes detected by the optical assembly and the first and second photo detectors of FIGS. 17A and 17B. In FIGS. 16A, 16B, 17A and 17B, the optical elements, the measuring surface, and the rays representing the light propagation direction are shown to be tilted at a greater angle than the actual for clarity of understanding.

Referring to FIGS. 1, 2, 9 and 14, first, the wafer W and the die D may be adsorbed and held on the first stage 22 and the second stage 32 of the die bonding system, respectively (S10).

For example, the wafer W may be held by vacuum suction via suction holes formed in the first stage 22. The die D individualized through a sawing process may be held, e.g., adsorbed, by vacuum suction via a collet formed in the second stage 32.

In this case, the optical assembly 200 of the parallelism measurement optical apparatus may be located at a standby position outside the first and second stages 22 and 32, e.g. in the standby position the optical assembly 200 may be in a non-overlapping position with respect to the first and second stages 22 and 32.

Then, a parallelism measurement between the wafer W and the die D may be performed.

In this specification, although it has been described that parallelism and deformation between the wafer and the die in die-to-wafer bonding are measured using the optical apparatus for measuring parallelism, it may not be limited thereto, and it will be appreciated that the optical apparatus for measuring parallelism may be used to measure the parallelism and deformation between two opposing reflective surfaces.

As illustrated in FIG. 1, the optical assembly 200 may be moved to a measurement position between the first and second stages 22 and 32 (S20), and parallelism between the surface of the wafer W and the surface of the die D and deformation of the die D may be measured (S30).

In particular, the optical assembly 200 may be moved in a horizontal direction (X-Z plane) by the optical head driver 106, to the position predetermined as the measurement position between the wafer W and the die D that are spaced apart along the vertical direction (Z direction) to face each other.

Then, the first light L1 having the first wavelength may be divided into the first measurement light L11 and the first reference light L21 using the optical assembly 200, and the first measurement light L11 may be sequentially incident on the wafer surface and the die surface to be reflected and then emitted from the optical assembly 200. The first reference light L23 and the first measurement light L17 emitted from the optical assembly 200 may pass through the first polarizer 300 and then may interfere with each other, and the first photo detector 310 may detect an interference signal of the lights emitted from the first polarizer 300.

Figure 15A:
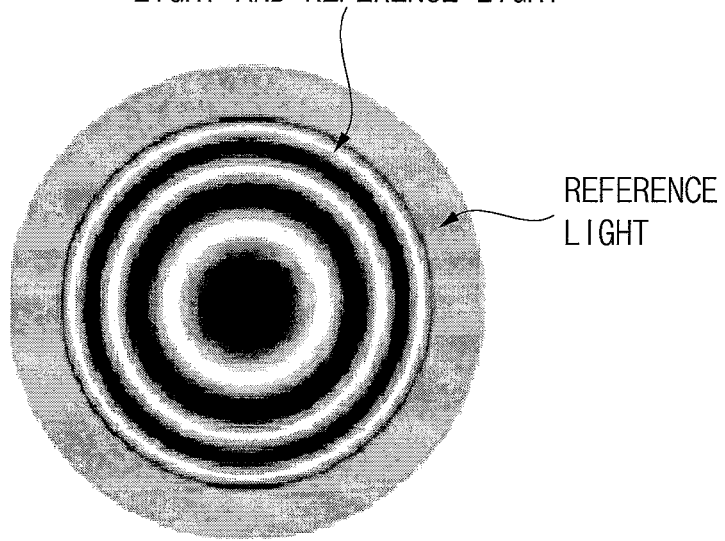
FIGS. 15A to 15D are views illustrating interference fringes detected by a first photo detector.
Figure 15B:
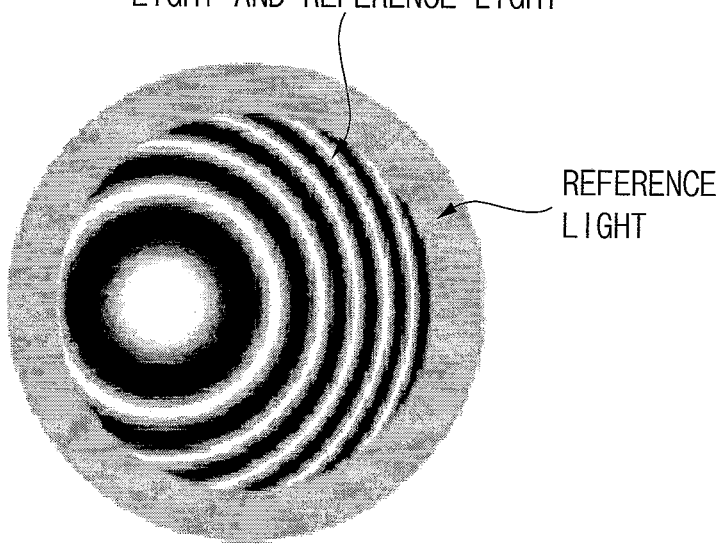
Figure 15C:
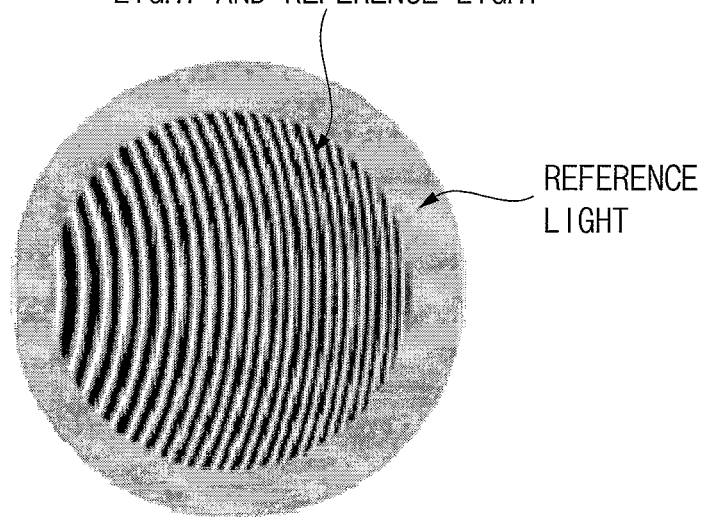

As shown in FIGS. 15A (die deformation no tilt), 15B (die deformation plus 0.01 degree tilt), 15C (die deformation plus 0.05 degree tilt), and 15D (no deformation, 0.05 degree tilt), not only the tilt of the die but also the deformation can be checked with the fringe. For example, when the wafer surface and the die surface are parallel to each other and there is a deformation in the die surface, an interference fringe of a curved shape may be obtained by the first photo detector 310. For example, FIG. 15A shows an interference fringe of a concentric shape obtained when there is only spherical deformation on the die surface without tilting of the die. When the die surface is inclined with respect to the wafer surface by a first angle in the first direction and there is a deformation in the die surface, the interference fringe of FIG. 15B may be obtained. When the die surface is inclined with respect to the wafer surface by a second angle greater than the first angle in the first direction and there is a deformation in the die surface, the interference fringe of FIG. 15C may be obtained. At this time, since the distance between the interference fringes in FIG. 15C is smaller than that of FIG. 15B, it can be seen that the deformation degree of FIG. 15C is greater than the deformation degree of FIG. 15B.

Figure 15D:
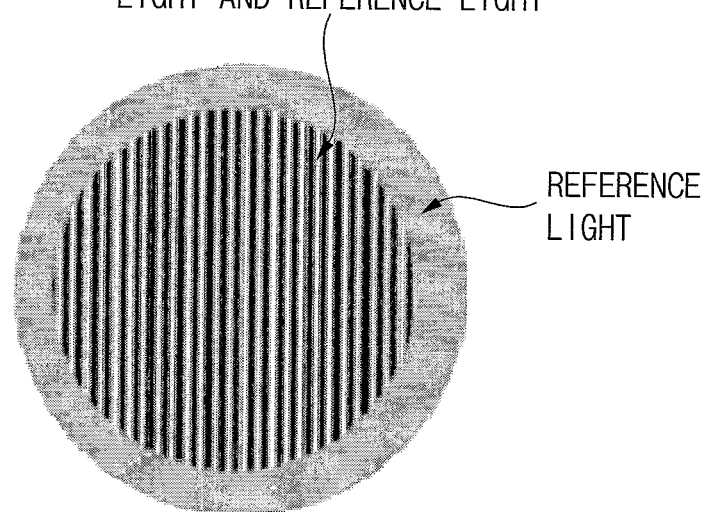

When the die surface is inclined with respect to the wafer surface by a second angle in the first direction and there is no deformation in the die surface, the interference fringe of FIG. 15D may be obtained.

Then, the inclination of the optical apparatus for measuring parallelism including the optical assembly 200 with respect to the surface of the wafer W may be measured (S40). The step (S40) of measuring the inclination of the optical apparatus for measuring parallelism may be performed simultaneously or sequentially with the step (S30) of measuring the degree of parallelism between the wafer surface and the die surface.

The second light B1 having the second wavelength different from the first wavelength may be divided into the second measurement light B11 and the second reference light B21 using the optical assembly 200, and the second measurement light B11 may be incident on and reflected from the wafer surface and then may emitted from the optical assembly 200. The second reference light B23 and the second measurement light B13 emitted from the optical assembly 200 may pass through the second polarizer 302 and then may interfere with each other, and the second photo detector 312 may detect an interference signal of the lights emitted from the second polarizer 302.

When the die surface is tilted with respect to the wafer surface by a first angle in the first direction (Z direction) and the optical assembly 200 is not tilted as illustrated in FIGS. 16A and 16B, FIG. 16C shows that the interference fringe is detected by the first photo detector 310 and an interference fringe is not be detected by the second photo detector 312 (ie, a null interference fringe may be obtained).

When the die surface is tilted with respect to the wafer surface by a first angle in the first direction (Z direction) and the optical assembly 200 is tilted by a second angle in the first direction (Z direction) and the second direction (X direction) as illustrated in FIGS. 17A and 17B, FIG. 17C shows that the interference fringe is detected by the first photo detector 310 and the interference fringe of diagonal lines is detected by the second photo detector 312.

In this case, the relative angle θ between the first reference light L23 and the first measurement light L17 emitted from the optical assembly 200 of FIG. 16B may be the same as the relative angle θ between the first reference light L23 and the first measurement light L17 emitted from the optical assembly 200 of FIG. 17B. From this, it can be seen that the tilt of the optical assembly 200 does not affect the number of interference fringes of the first reference light and the first measurement light. Therefore, even when the optical assembly 200 is tilted, the parallelism between the wafer surface and the die surface may be measured.

Then, an optimized state for wafer-die bonding may be provided based on the parallelism and deformation results (S50). For example, the tilts (inclinations) of the first and second stages 22 and 32 may be adjusted based on the parallelism and deformation results.

The adsorption structure of the second stage 32 may include an adsorption pad having a bottom surface to which the die is attached. The bottom surface of the adsorption pad may be provided as the second suction surface 33. The adsorption pad may include a cavity formed therein, and a shape of the bottom surface may be adjusted by a pressure of air in the cavity. When the pressure of air in the cavity is increased, the shape of the bottom surface of the adsorption pad may be deformed convexly downward. When the pressure of air in the cavity is decreased, the shape of the bottom surface of the adsorption pad may be elastically restored to an initial state and may be restored to a flat shape, or may be deformed to be concave downward. Accordingly, the shape of the second suction surface 33 of the second stage 32 may be adjusted based on the deformation results (eg, spherical deformation), to make the die an improved shape.

Then, the first alignment mark formed on the wafer W and the second alignment mark formed on the die D may be imaged (S60), and position alignment between the wafer W and the die D may be performed based on information on relative positions between the first and second alignment marks (S70).

An optical apparatus for alignment inspection may be provided together with the optical apparatus 100 for measuring parallelism. The optical apparatus for alignment inspection may include an microscope configured to irradiate an illumination light onto the first and second alignment marks having a size of several hundred micrometers (μm) and detect reflected lights reflected from the first and second alignment marks. For example, the optical apparatus 100 for measuring parallelism may be integrally coupled to the optical microscope of the optical apparatus for alignment inspection. In this case, the inclination of the optical apparatus for alignment inspection may be corrected using the optical device for measuring parallelism.

The reflected lights may include image information for the first and second alignment marks. The relative positions between the first and second alignment marks may be detected using the image information. The controller 400 may calculate an alignment error between the die D and the wafer W based on the relative positions between the first and second alignment marks. The controller 400 may control the operation of the bonding head driver 34 to align the first and second stages 22 and 32 in order to remove the alignment error.

Then, the optical apparatus 100 for measuring parallelism may be moved to the standby position (S80), and the die D and the wafer W may be bonded (S90).

After the optical apparatus 100 for measuring parallelism is moved to the standby position by the optical head driver 106, the second stage 32 may descend to press the die D onto the wafer W. In this case, a heater may be provided in the second stage 32 to heat the die D to thermo-compression bond the die D on the wafer W.

The above die bonding system 10 may be used to manufacture a semiconductor package including semiconductor devices, e.g., logic devices or memory devices. The semiconductor package may include logic devices, e.g., central processing units (CPUs), main processing units (MPUs), or application processors (APs), or the like, and volatile memory devices, e.g., dynamic random access memory (DRAM) devices, high bandwidth memory (HBM) devices, or non-volatile memory devices, e.g., flash memory devices, phase change random access memory (PRAM) devices, magnetic random access memory (MRAM) devices, resistive random access memory (ReRAM) devices, or the like.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A parallelism measurement optical apparatus, comprising:

an optical assembly installed so as to be movable in a horizontal direction between a first stage and a second stage, wherein the first stage is configured to hold a wafer on a first surface thereof and the second stage is configured to hold a die on a second surface thereof, the first surface and the second surface being spaced apart along a vertical direction perpendicular to the horizontal direction, and wherein the optical assembly comprises:

a first polarizing beam splitter configured to divide an incident light into a reference light and a measurement light;

a reference mirror disposed on a side of a first surface of the first polarizing beam splitter and configured to reflect the reference light reflected from the first polarizing beam splitter again to the first polarizing beam splitter;

a first quarter wave plate disposed between the first polarizing beam splitter and the reference mirror and configured to change a polarization state of the reference light;

a second polarizing beam splitter disposed on a side of a second surface adjacent to the first surface of the first polarizing beam splitter and configured to reflect the measurement light passing through the first polarizing beam splitter;

a second quarter wave plate disposed on a side of a second first surface of the second polarizing beam splitter and configured to change a polarization state of the measurement light reflected from the second polarizing beam splitter;

a third quarter wave plate disposed on a side of a third surface opposite to the second first surface of the second polarizing beam splitter and configured to change the polarization state of the measurement light passing through the second polarizing beam splitter;

a reflection mirror disposed on a side of a second surface adjacent to the second first surface of the second polarizing beam splitter and configured reflect the measurement light reflected from the second polarizing beam splitter again to the second polarizing beam splitter; and a fourth quarter wave plate disposed between the second polarizing beam splitter and the reflection mirror and configured to change the polarization state of the measurement light reflected from the second polarizing beam splitter.

2. The parallelism measurement optical apparatus of claim 1, wherein a first incident plane that is perpendicular to a first polarization splitting plane of the first polarizing beam splitter and is coincident with a light propagation direction is orthogonal to a second incident plane that is perpendicular to a second polarization splitting plane of the second polarizing beam splitter and is coincident with a light propagation direction.

3. The parallelism measurement optical apparatus of claim 1, wherein the incident light has a first wavelength, and the first to fourth quarter wave plates delay the phase of the light by 90°.

4. The parallelism measurement optical apparatus of claim 3, wherein the reference light reflected by the first polarizing beam splitter is S-polarized light, and the measurement light passing through the first polarizing beam splitter is P-polarized light.

5. The parallelism measurement optical apparatus of claim 3, wherein the reference light reflected from the reference mirror and incident on the first polarizing beam splitter past the first quarter wave plate is parallel with an incident plane of a first polarization splitting surface of the first polarizing beam splitter.

6. The parallelism measurement optical apparatus of claim 3, wherein the measurement light passing through the first polarizing beam splitter is reflected from a first measurement surface and a second measurement surfaces respectively facing the first and third surfaces of the second polarizing beam splitter, respectively, and the reflected measurement light is re-incident to the second polarizing beam splitter, and the reflection mirror reflects the re-incident measurement light reflected from the second polarizing beam splitter again to the second polarizing beam splitter.

7. The parallelism measurement optical apparatus of claim 6, wherein the measurement light reflected by the reflection mirror and incident on the second polarization beam splitter past the fourth quarter wave plate is parallel with an incident plane of a second polarization splitting surface of the second polarization beam splitter.

8. The parallelism measurement optical apparatus of claim 1, further comprising:
a polarizer configured to interfere the reference light emitted from the first polarization beam splitter and the measurement light emitted from the first polarization beam splitter past the second polarization beam splitter with each other.

9. The parallelism measurement optical apparatus of claim 1, wherein the light has a second wavelength, and the first and second quarter wave plates delay the phase of the light by 180°.

10. The parallelism measurement optical apparatus of claim 9, wherein the reference light reflected from the reference mirror and incident on the first polarizing beam splitter past the first quarter wave plate is perpendicular to an incident plane of a first polarization splitting surface of the first polarizing beam splitter, and the measurement light passing through the first polarizing beam splitter is reflected to a first measurement surface facing the first surface of the second polarizing beam splitter, and is reflected from the first measurement surface and re-incident to the second polarization beam splitter past the second quarter wavelength, and the re-incident measurement light is perpendicular to an incident plane of a second polarization splitting surface of the second polarization beam splitter.

11. A parallelism measurement optical apparatus, comprising:
a first illuminator configured to irradiate a first light, wherein the first light is linearly polarized;
an optical assembly configured to polarization modulate the first light to divide into a reference light having a first polarization component and a measurement light having a second polarization component, wherein the measurement light is sequentially incident on and reflected from a first measurement surface and a second measurement surface that are spaced apart along a vertical direction to face each other, and is emitted to have information on parallelism between the first and second measurement surfaces;
a first polarizer configured to interfere the reference light and the measurement light emitted from the optical assembly with each other; and
a first light detector configured to detect an interference signal of lights emitted from the first polarizer.

12. The parallelism measurement optical apparatus of claim 11, wherein the optical assembly includes,
a first polarizing beam splitter configured to divide the first light into the reference light and the measurement light;
a reference mirror configured to reflect the reference light reflected from the first polarizing beam splitter again to the first polarizing beam splitter;
a first quarter wave plate disposed between the first beam polarizing beam splitter and the reference mirror and configured to change a polarization state of the reference light; and
a light switch configured to direct the measurement light passing through the first polarizing beam splitter to be sequentially incident on and reflected from the first and second measurement surfaces and direct the reflected light to be re-incident to the first polarizing beam splitter.

13. The parallelism measurement optical apparatus of claim 12, wherein the light switch includes,
a second polarizing beam splitter having a second incident plane that is orthogonal to a first incident plane that is perpendicular to a first polarization splitting plane of the first polarizing beam splitter and is coincident with a light propagation direction, the second polarizing beam splitter being configured to reflect the measurement light passing through the first polarizing beam splitter;
a reflection mirror configured reflect the measurement light reflected from the second polarizing beam splitter again to the second polarizing beam splitter;
a second quarter wave plate disposed between the second beam polarizing beam splitter and the first measurement surface and configured to change a polarization state of the measurement light;
a third quarter wave plate disposed between the second beam polarizing beam splitter and the first measurement surface and configured to change the polarization state of the measurement light;
a fourth quarter wave plate disposed between the second polarizing beam splitter and the reflection mirror and configured to change the polarization state of the measurement light.

14. The parallelism measurement optical apparatus of claim 13, wherein the incident light has a first wavelength, and the first to fourth quarter wave plates delay the phase of the light by 90°.

15. The parallelism measurement optical apparatus of claim 14, wherein the reference light reflected from the reference mirror and incident on the first polarizing beam splitter past the first quarter wave plate is parallel with an incident plane of a first polarization splitting surface of the first polarizing beam splitter.

16. The parallelism measurement optical apparatus of claim 14, wherein the measurement light passing through the first polarizing beam splitter is reflected from the first measurement surface and the second measurement surfaces respectively and the reflected measurement light is re-incident to the second polarizing beam splitter, and the reflection mirror reflects the re-incident measurement light reflected from the second polarizing beam splitter again to the second polarizing beam splitter.

17. The parallelism measurement optical apparatus of claim 16, wherein the measurement light reflected by the reflection mirror and incident on the second polarization beam splitter past the fourth quarter wave plate is parallel with an incident plane of a second polarization splitting surface of the second polarization beam splitter.

18. The parallelism measurement optical apparatus of claim 13, further comprising:
   a second illuminator configured to irradiate a linearly polarized second light to the optical assembly;
   a second polarizer configured to interfere a second reference light and a second measurement light emitted from the optical assembly with each other; and
   a second light detector configured to detect an interference signal of lights emitted from the second polarizer.

19. The parallelism measurement optical apparatus of claim 18, wherein the second light has a second wavelength, and the first and second quarter wave plates delay the phase of the second light by 180°.

20. The parallelism measurement optical apparatus of claim 11, wherein the first polarizer linearly polarizes the reference light and the measurement light in a 45° direction.

* * * * *